US010495230B1

(12) United States Patent
Chandler, Jr. et al.

(10) Patent No.: US 10,495,230 B1
(45) Date of Patent: Dec. 3, 2019

(54) PISTON VALVE WITH ANNULAR PASSAGES

(71) Applicant: Chandler Systems, Inc., Ashland, OH (US)

(72) Inventors: William D. Chandler, Jr., Ashland, OH (US); Aaron R. Wolfe, Ashland, OH (US); Cody A. Harbaugh, Ashland, OH (US)

(73) Assignee: CHANDLER SYSTEMS, INC., Ashland, OH (US)

( * ) Notice: Subject to any disclaimer, the term of this patent is extended or adjusted under 35 U.S.C. 154(b) by 0 days.

(21) Appl. No.: 15/960,955

(22) Filed: Apr. 24, 2018

Related U.S. Application Data

(63) Continuation-in-part of application No. 15/261,442, filed on Sep. 9, 2016, now Pat. No. 9,970,558, and a continuation-in-part of application No. 15/590,733, filed on May 9, 2017, now Pat. No. 10,011,500, which is a continuation-in-part of application No. 15/261,442, filed on Sep. 9, 2016, now Pat. No. 9,970,558, and a continuation-in-part of application (Continued)

(51) Int. Cl.
| | |
|---|---|
| *B01J 4/00* | (2006.01) |
| *F16K 11/07* | (2006.01) |
| *C02F 5/00* | (2006.01) |
| *C02F 1/42* | (2006.01) |
| *B01D 24/38* | (2006.01) |

(52) U.S. Cl.
CPC ............ *F16K 11/0716* (2013.01); *C02F 1/42* (2013.01); *C02F 5/00* (2013.01); *B01D 24/383* (2013.01); *B01J 4/007* (2013.01); *B01J 4/008* (2013.01); *C02F 2201/005* (2013.01); *C02F 2301/043* (2013.01)

(58) Field of Classification Search
CPC ......... B01D 24/383; B01J 4/007; B01J 4/008; C02F 2301/043; C02F 2201/005; F16L 39/005
USPC .......... 137/625.67, 625.68, 625.69; 210/190, 210/191, 278
See application file for complete search history.

(56) References Cited

U.S. PATENT DOCUMENTS

| | | | | |
|---|---|---|---|---|
| 4,374,025 A | * | 2/1983 | Loke | ........................ C02F 1/42 |
| | | | | 210/140 |
| 4,919,314 A | * | 4/1990 | Nishiyama | ................ C02F 1/42 |
| | | | | 137/624.13 |

(Continued)

*Primary Examiner* — Marina A Tietjen
*Assistant Examiner* — Paul J Gray
(74) *Attorney, Agent, or Firm* — Ralph E. Jocke; Walker & Jocke

(57) ABSTRACT

A control valve (10) includes a valve body with a plurality of ports (A, B, C, D, E, F) and a plurality of annular flow passages (53, 55, 57). A piston (34) which includes a plurality of annular flow passages and a longitudinal flow passage is selectively movable within a bore (32) within the valve body through operation of a valve controller (70). The valve controller is selectively operative to control the position of the piston so as to enable liquid flow through a plurality of flow paths. The valve controller further includes a installable and removable valve controller housing (74) which is releasably engageable with a valve base (72). The valve may include a changeable piston and changeable injector and plug components to adapt the valve to different flow and fluid mixing requirements.

28 Claims, 27 Drawing Sheets

Related U.S. Application Data

No. 14/698,399, filed on Apr. 28, 2015, now abandoned.

(60) Provisional application No. 62/522,139, filed on Jun. 20, 2017, provisional application No. 61/986,423, filed on Apr. 30, 2014, provisional application No. 62/069,897, filed on Oct. 29, 2014, provisional application No. 62/119,507, filed on Feb. 23, 2015.

(56) References Cited

U.S. PATENT DOCUMENTS

| | | | | |
|---|---|---|---|---|
| 5,096,596 | A * | 3/1992 | Hellenbrand | C02F 1/004 210/721 |
| 5,919,373 | A * | 7/1999 | Naaktgeboren | C02F 1/74 210/109 |
| 6,402,944 | B1 * | 6/2002 | Vaughan | C02F 1/42 137/597 |
| 6,596,159 | B1 * | 7/2003 | Maruyama | B01J 49/85 137/624.11 |
| 6,883,543 | B2 * | 4/2005 | Tew | B64G 1/401 137/624.13 |
| 2005/0247634 | A1 * | 11/2005 | Petty | C02F 1/008 210/673 |
| 2009/0236849 | A1 * | 9/2009 | Takasaki | F16L 39/005 285/123.15 |
| 2010/0013213 | A1 * | 1/2010 | Katsura | F16J 15/062 285/29 |
| 2010/0200522 | A1 * | 8/2010 | Tischendorf | C02F 1/001 210/798 |

* cited by examiner

PISTON VALVE WITH ANNULAR PASSAGES

TECHNICAL FIELD

Exemplary embodiments relate to piston valves with annular passages which may be classified in US Class 137, Subclass 625.690. Exemplary embodiments relate to valve arrangements that are utilized in connection with devices which require fluid flow through multiple flow paths, for example, systems for water treatment.

BACKGROUND

Valve arrangements for controlling the flow of liquids may have numerous different forms. In situations where the liquid is required to be selectively directed to multiple different flow paths, such arrangements can be complex. Additional complexity may arise when different flow sequences and flow paths are required in connection with different process steps involving a liquid. Further complexity arises when liquids are required to be mixed with other fluids in connection with carrying out process flows.

Valve arrangements may benefit from improvements.

SUMMARY

Exemplary embodiments include a valve arrangement that is capable of selectively directing a liquid to multiple different flow paths. The exemplary embodiment includes a control valve having a valve body. The valve body includes an elongated longitudinal cylinder bore. The cylinder bore is in fluid communication with a plurality of different liquid ports which include inlet and outlet ports. The ports are in fluid connection with a plurality of respective generally annular passages extending adjacent to the bore within the valve.

A piston is movably positionable longitudinally within the cylinder bore. The exemplary piston includes a profile configuration which includes a plurality of longitudinally disposed annular flow cavities. Selectively positioning the piston longitudinally in the bore through operation of a valve controller causes the different ports of the valve to be placed in fluid communication. The exemplary valve controller is operative to enable the valve to be used in conjunction with other process equipment for purposes of selectively directing the flow of liquid through the equipment in different flow paths during a plurality of process steps. Such process steps may include steps involving mixing of the liquid with other fluids and materials as required. The exemplary valve further includes the capability to selectively shut off liquid flow and to provide bypass flow in order to stop and bypass the flow of liquid from certain process equipment associated with the valve.

Exemplary arrangements specifically relate to a water control valve that is selectively operative to enable the removal of undesirable chemicals from water. The exemplary valve is operative to enable flow conditions to be changed to regenerate a resin material in a tank when necessary to maintain optimal performance of the system in removing undesirable substances. Exemplary arrangements further provide a valve that includes the functionality of an integrated water shutoff valve and a bypass valve. This exemplary valve arrangement eliminates the need for separate valves and piping to accomplish such functions.

Further exemplary arrangements include a readily changed or modified valve controller for operation of the exemplary valve. The exemplary valve controller enables the valve controller to be readily installed, removed and replaced when necessary for maintenance or repair purposes. Further the exemplary arrangement provides a means for readily operatively connecting the valve controller and the valve body so that they may operate together.

Numerous other novel arrangements and features are described in connection with the exemplary embodiments discussed herein.

DETAILED DESCRIPTION

The exemplary arrangements of the embodiments described herein may be used in conjunction with the components, features, systems and methods described in U.S. patent application Ser. Nos. 14/698,381, 14/698,399 filed Apr. 28, 2015, and/or 15/590,733 filed May 9, 2017, the disclosures of each of which are incorporated herein by reference in their entirety.

Figure 1:
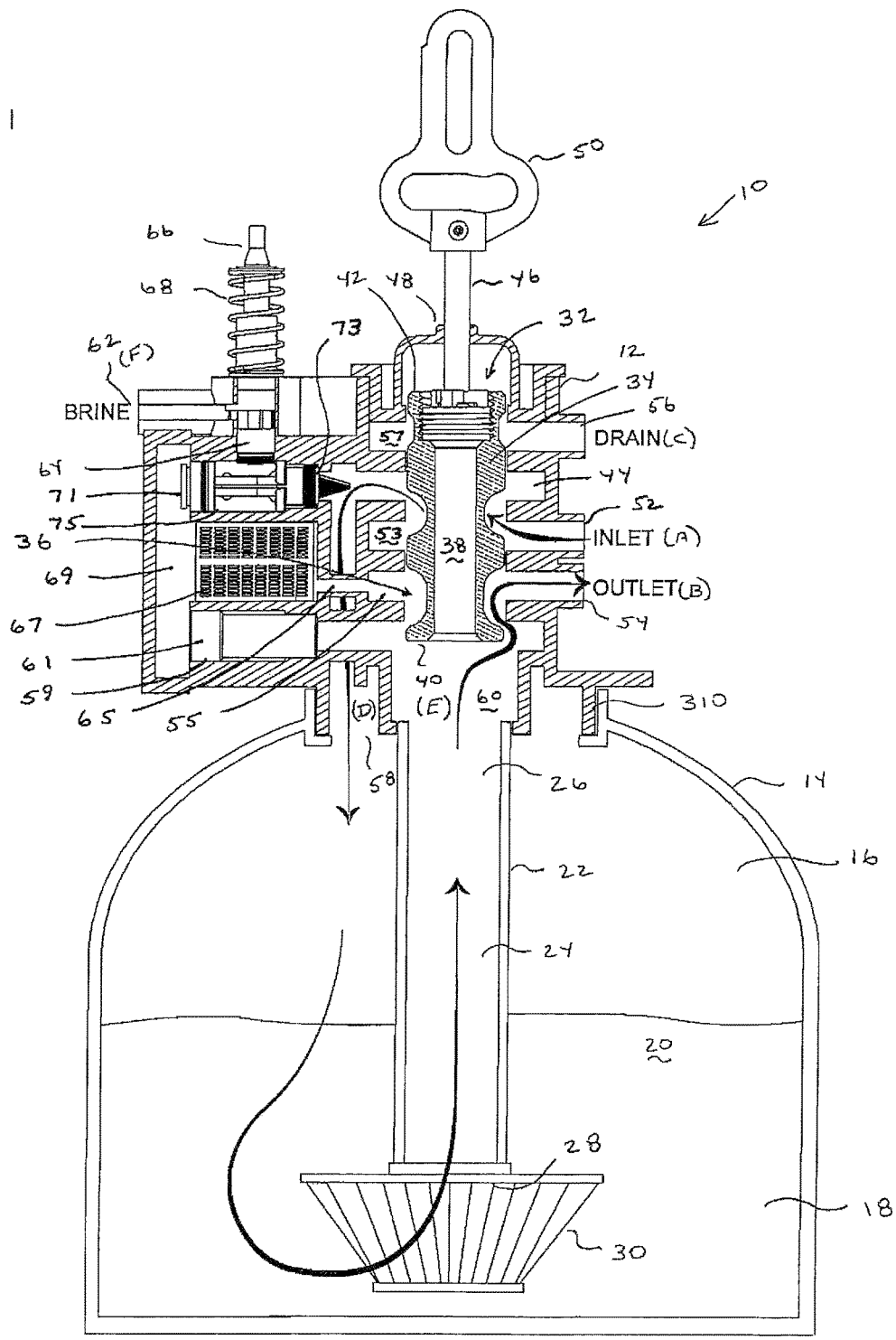
FIG. 1 is a schematic cross-sectional view of an exemplary control valve including a movable piston and a plurality of annular flow passages configured for use in connection with a water treatment tank.

Referring now to the drawings and particularly FIG. 1, it is shown therein an exemplary control valve generally indicated 10. Control valve 10 includes a valve body 12. The valve body 12 is schematically represented and is comprised of one or more parts which function in the manner that is represented schematically in FIGS. 1-8.

The exemplary valve is used in operative connection with a water treatment tank 14. Tank 14 of the exemplary arrangement is a water softener tank that extends generally vertically with the valve 10 positioned at the top thereof via a threaded or other releasable connection. It should be appreciated that the water treatment application is only an exemplary use for the control valve configuration and that the proportions of the tank as shown in the Figures are not necessarily representative of tanks that may be utilized in connection with the control valve described. Rather, in most water treatment arrangements the exemplary valve will be used with a vertically elongated tank which is many times longer than the height of the valve body. Further the exemplary valve may be used in conjunction with other types of processing systems and equipment.

The exemplary water treatment tank includes a top portion 16 and a bottom portion 18. The exemplary tank includes a water treatment material 20 therein. In some exemplary arrangements, the water treatment material 20 comprises resin material that is suitable for ion exchange with mineral laden water that is treated by flowing therethrough. Such resin material may be comprised of plastic beads or zeolite material that has a negative charge. The exemplary operation of the water treatment tank includes capturing ions in water that make the water "hard" such as calcium and magnesium ions and replacing such ions in the water with ions that are not undesirable such as sodium ions. In other embodiments other types of treatment materials other than ion exchange resin materials may be used. These materials may include absorbent materials, filtration materials, catalytic materials, dissolving materials, reacting materials or other types of materials. Of course it should be understood that the types of liquid processing, treatment materials and methods described are exemplary and in other arrangements, other types or additional types of equipment, materials, structures and elements for treating water or other liquids may be used.

In the exemplary arrangement, the tank 14 includes a central tube 22 extending vertically therein. Tube 22 includes an internal tube conduit 24. The exemplary tube conduit extends between a top end 26 of the tube and a bottom end 28 of the tube. The bottom end of the tube is fluidly open to the area of the tank that includes the resin material. The bottom end of the tube is in operative connection with a strainer 30. Strainer 30 operates to prevent the resin from entering the fluid conduit inside the tube.

The exemplary valve body includes an elongated cylindrical bore 32. The bore 32 is elongated in a longitudinal direction which is the vertical direction as the valve is shown in FIG. 1. The longitudinal direction may alternatively be referred to as an axial direction herein. The bore 32 has a movable piston 34 therein. The piston 34 includes on its outer circumferential surface, a plurality of longitudinally spaced recessed annular flow cavities such as cavity 36. The exemplary piston 34 also includes a longitudinal flow cavity 38. Longitudinal flow cavity 38 extends through the piston from a first longitudinal end 40 to a second longitudinal end 42.

The valve body further includes a plurality of annular flow cavities 44 for example, that extend in at least partially surrounding relation of the bore 32. Although not shown in the drawings, but as described in the incorporated disclosures, exemplary embodiments include resilient seals that operatively extend between the piston and the walls of the valve body that extend radially inward toward the bore. The resilient seals are operative to prevent fluid flow between the radially outwardly disposed annular surfaces of the piston and the annular radially inward extending walls bounding the flow cavities of the valve body. In exemplary arrangements, the seals are configured to prevent fluid flow other than through flow cavities that are in operative fluid connection through the selective longitudinal positioning of the piston as described herein.

In the exemplary embodiment, the piston 34 is in operative connection with a piston rod 46. The piston rod 46 is operatively connected to the second longitudinal end of the piston. The exemplary piston rod is operatively connected to the piston through a releasable threaded connection as shown. In the exemplary embodiment the threaded connection includes a coupling with fluid openings therethrough that enables the flow of liquid through the longitudinal flow passage. The coupling also enables the piston to be removed and replaced with a piston of a different configuration.

The exemplary piston rod extends through an opening 48 in the valve body. A suitable resilient seal is provided adjacent the opening so as to prevent the escape of liquid from the inside of the valve body around the piston rod. The piston rod is operatively connected at the end outside the valve body to an actuator bracket 50. The actuator bracket 50 is in operative connection with a valve controller of a type later described herein and/or as described in the incorporated disclosures. The valve controller is operative to selectively longitudinally move the actuator bracket and the piston rod so as to selectively position the piston to provide different flow conditions.

The exemplary valve body includes a plurality of ports. The ports include an inlet port 52 which is designated with the letter A for purposes of brevity. The exemplary inlet port is in operative connection with a source of untreated water. In exemplary embodiments, the source of untreated water may be a well, reservoir or other source of water that requires the treatment provided by passing the water through the water treatment material tank. In exemplary arrangements the untreated water is provided at an elevated pressure to the inlet port 52. This is accomplished through the use of a pump, the head of liquid in a tank or reservoir, or other suitable method for providing the water to the inlet port at a positive pressure. As represented schematically in Figures, the inlet port A is in operative fluid connection with an annular flow cavity 53 within the valve body.

The valve body further includes an outlet port 54. Outlet port 54 which is designated B for purposes of brevity, is configured to be in operative connection with one or more devices that use treated water. For example, the outlet port 54 may be fluidly connected to a piping system within the building in which the water treatment equipment is installed. In such an exemplary system the outlet port B is in operative connection with treated water use devices such as faucets, showers, hot water tanks, etc. which deliver, store and/or use water that has been treated by having passed through the tank. Of course this application is exemplary. As represented in Figures, the outlet port B is in operative connection with an annular flow cavity 55 within the valve body that is longitudinally disposed from the annular cavity in the valve body that is connected to Port A.

The exemplary valve body further includes a drain port 56. Drain port 56 which is designated C for purposes of brevity is configured in the exemplary system to be in operative connection with a drain which receives waste water. The drain port 56 is in operative connection with an annular flow cavity 57 within the valve body as represented in the Figures. Further it should be understood that although the drain port C is configured to be in connection with a wastewater drain, the water passed from the exemplary drain port may be captured for treatment and recycling or for other suitable purposes.

The exemplary valve body further includes a first tank port 58. The first tank port 58 is labeled D for purposes of brevity herein. In the exemplary arrangement the first tank port D is fluidly connected through the valve to a first area at the top of a tank. This first area is on an upper side of the resin material 20 in the tank. In the exemplary arrangement the first tank port 58 is above the level of the resin material 20 as shown. Of course it should be understood that this arrangement is exemplary and other arrangements of components may be used in connection with other embodiments.

The exemplary valve body further includes a second tank port 60. The second tank port 60 which is labeled E for purposes of brevity, is in operative connection with the tube conduit 24 within the tube 22. The second tank port 60 is in operative fluid connection with the lower area of the tank through an opening at the bottom end 28 of the tube and the strainer 30. The second tank port 60 is in operative fluid connection with the lower side of the resin material.

The exemplary valve body further includes a further port that in the exemplary system is referred to as brine port 62. Brine port 62 which is labeled F for purposes of brevity, is configured for operative connection with a brine tank. The brine tank of exemplary embodiments may provide a slurry of water softener salt and water which produces a brine solution which is utilized for regenerating the resin material in the tank in a manner that is later discussed. The exemplary brine port 62 is in operative connection with a movable valve member 64. The movable valve member 64 is movable within the valve body and depending on the position of the movable valve member, is operative to place the brine port 62 in fluid connection with at least one fluid cavity within the valve body. In the exemplary embodiment a moveable plunger 66 is in operative connection with the at least one movable valve member 64. A spring 68 is in operative connection with the plunger and serves to bias the plunger upwardly from the valve body as shown so as to close the valve member 64. As later explained in detail, the valve controller is operative to selectively move the plunger 66 so as to operatively connect the brine port to flow cavities within the valve for purposes of delivering treated water out of the valve from the brine port and for receiving brine material from the brine tank.

In the exemplary embodiment the valve includes an injector 71. The injector 71 is positioned in a passage 75. The injector further includes a check valve 73. The check valve 73 enables flow from the injector to the flow cavity 44 and prevents flow in the opposite direction. In the exemplary arrangement the injector is removably positionable in the passage 75.

The exemplary valve body further includes a passage 59. In the configuration shown in FIG. 1, the passage 59 is closed by a removable plug 61.

The exemplary valve body further includes a passage 65. Passage 65 is fluidly connected with annular cavity 55. The valve body further includes a chamber 69. Chamber 69 is in fluid communication with passage 65. A screen 67 is positioned fluidly intermediate of the passage 65 and the chamber 69. Chamber 69 is in fluid connection with the injector 71.

The exemplary embodiment of the control valve operates in an exemplary system in a manner similar to that described in greater detail in the incorporated disclosure. A valve controller that is in operative connection and with the actuator bracket moves the bracket along the longitudinal direction which is the vertical direction as shown in FIG. 1 and selectively positions the piston to achieve a plurality of flow conditions along different flow paths through the valve. In an exemplary first condition of the valve represented in FIG. 1, untreated water is received into the valve through the inlet A. Water passes through the valve cavities of the piston and the valve body as represented by the arrows shown in FIG. 1. The untreated water is in fluid connection through the valve with the first tank port D. In this flow condition the check valve 73 prevents flow of untreated water through the injector 71 to cavity 55 and the outlet B. Untreated water flows from the first tank port downward through the top of the tank and into the resin material 20. In some exemplary arrangements the top of the tank may include a gas such as air or oxygen to react with materials dissolved in the incoming water to produce reaction products that can be more readily separated from the water. In the exemplary arrangement the water passing through the resin material undergoes an ion exchange in which calcium, magnesium and other positively charged ions in the water are captured by the resin and replaced in the water with sodium ions which are present in the resin.

In the condition shown in FIG. 1 the water that has been treated by passing downward through the resin passes through the strainer 30 and travels upwardly through the tube conduit 24 to the second tank port E. From this position the now treated water passes through the valve body from the second tank port E to the treated water outlet port B. The treated water is passed from the water outlet B to piping and to the devices which use the treated water.

Figure 2:
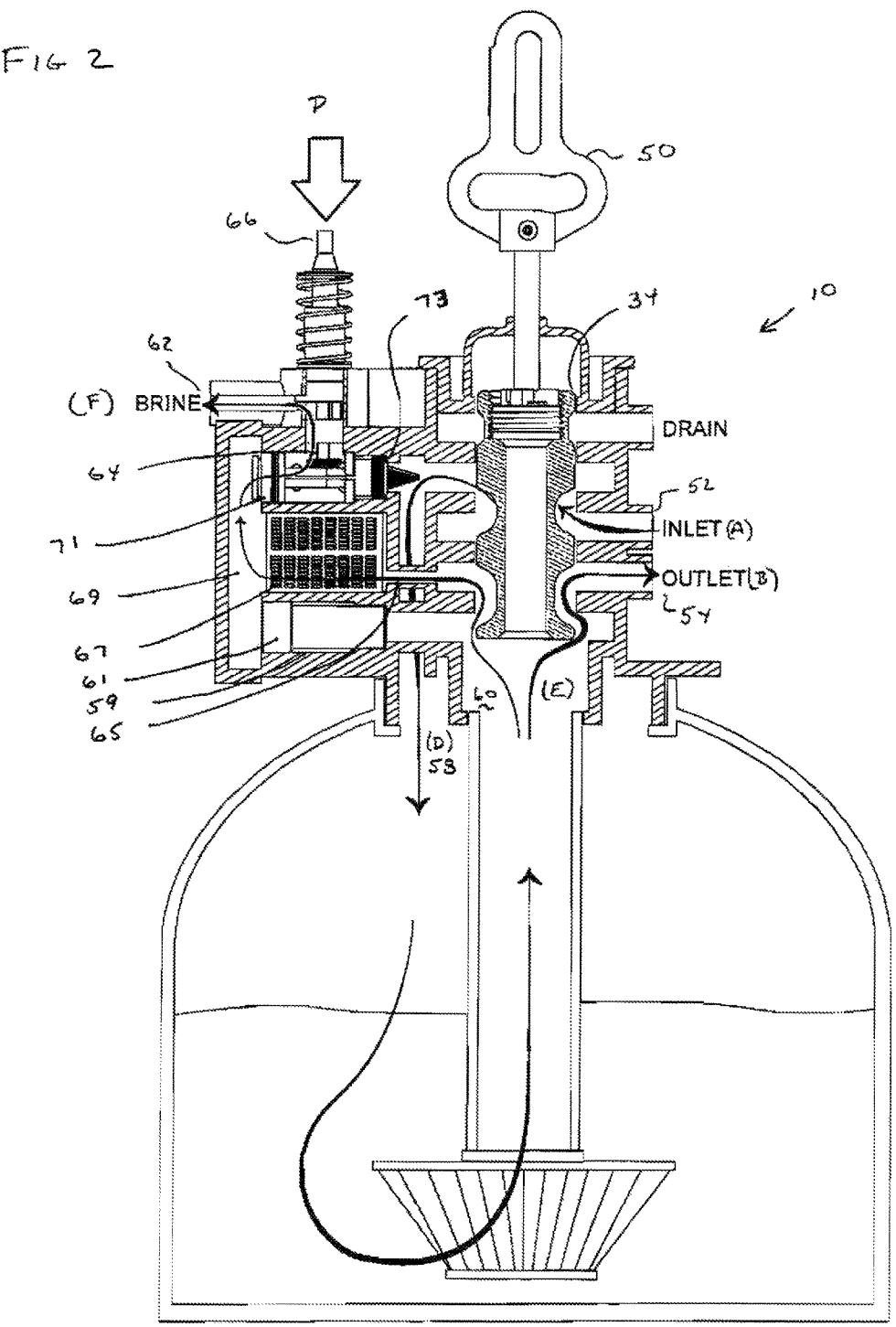
FIG. 2 is a view similar to FIG. 1 which shows the control valve in a different operating condition.

In the exemplary embodiment the valve controller operates the valve to deliver treated water from the brine port F of the valve to the brine tank at selected appropriate times. This is done in the exemplary system so that the brine solution is available for delivery to the valve 10 and the resin material 20 when required. In order to provide available brine, the valve controller is operative to depress plunger 66 downward as represented by arrow P as shown in FIG. 2. Moving the plunger downward is operative to move the movable valve member 64. Movement of the valve member 64 enables water that has been treated by passing through the resin and received at the second tank port E to be passed out of the valve through the brine port F.

In this valve configuration, the treated water passes through the passage 65, through the screen 67 and into the chamber 69. From the chamber 69 the water flows into the interior of the body of the injector 71 (later described in detail) and to the brine port F past the open valve element 64. It should be noted that the check valve 73 prevents the flow of untreated water into the body of the injector 71. Further, passage 59 which has a configuration similar to the passage which includes the injector body 71, is fluidly blocked by the plug 61 so as to require treated water to flow through the passage 65, the screen 67 and chamber 69 into the injector body.

In the exemplary system treated water is passed out through the brine port for a sufficient time to enable production of suitable brine solution by mixing of the water with water softener salt that has been placed in the brine tank. The production of the brine and the measurement of the salt levels and other features associated with the brine tank are discussed in the incorporated disclosures. As can be appreciated from FIG. 2, with the piston 34 positioned as shown, while treated water is being delivered to the brine tank the exemplary valve continues to deliver treated water from the second tank port E of the tank to the water outlet B.

After a period of operation of the exemplary system, the amount of water that has been treated by passing through the resin material causes the ions in the resin material to change their character to the point that the undesirable calcium and magnesium ions in the untreated water are no longer satisfactorily replaced through the ion exchange with the more desirable sodium ions. When this condition occurs, the resin treatment material can be cleaned and regenerated in the manner discussed in the incorporated disclosures and as described herein, so as to return the resin material to satisfactory performance. In various embodiments the need to regenerate the resin may be determined on a timed basis, on the basis of the amount of water that has passed through the tank, or based upon sensing the properties of the treated water that has been delivered from the outlet B through suitable electronic sensors. As can be appreciated, in exemplary systems while the resin in the water softener is being regenerated, treated water may be supplied to the devices and systems that use treated water from a storage tank holding a supply of treated water or by treating the water with another water treatment device.

Figure 3:
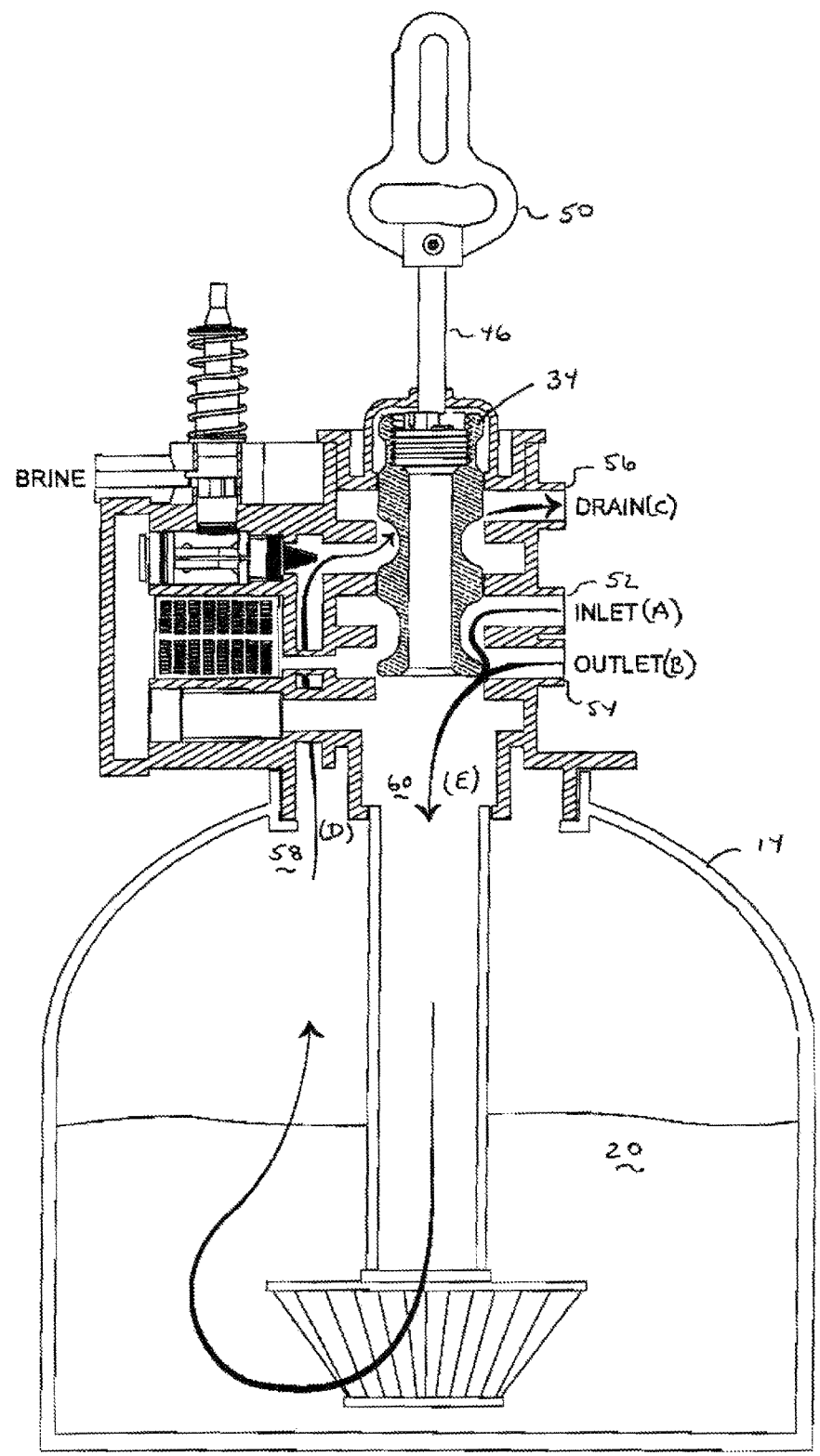
FIG. 3 is a view similar to FIG. 1 which shows the control valve in yet another operating condition.

Operation of the exemplary valve in a first step in a treatment media regeneration process is represented in FIG. 3. As shown in FIG. 3, the piston 34 of the valve is moved so as to be disposed upward from the positions shown in FIGS. 1 and 2. This is done in the exemplary embodiment by moving the piston in the longitudinal direction by movement of the actuator bracket 50 and the piston rod 46.

Movement of the piston 34 to the position shown in FIG. 3 causes the inlet and outlet ports A and B of the valve to be in fluid connection with the second tank port E. Further in this position of the piston, the first tank port D is in operative connection through the valve body with the drain C. As represented by the water flow arrows shown in FIG. 3, the untreated water at the elevated pressure and some treated water which can be drawn back through the water outlet B, pass through the valve to the second tank port E and downward through the tube 22. The water passes through the bottom of the tube and outwardly through the strainer. The water is dispersed and flows upwardly through the resin 20 so as to backwash the resin. The backwash represents a reversal from the normal flow during water treatment and causes particles and other materials that have been captured in the resin to flow upward in the tank.

The water flowing upward in the tank flows into the first tank port D and through the valve body to the drain C. As a result, the particulates and other contaminants that can be dislodged and removed by backwashing the resin are caused to flow out the top of the tank, through the valve and are discharged to a suitable waste drain through the drain port C. The backwash portion of the cycle continues for a suitable time in accordance with the programming of the valve controller or associated control device to achieve the release of the majority of the particulates and contaminants that have been captured in the resin material. The backwash operation may be continued on a timed or other basis sufficient to complete the operation.

Figure 4:
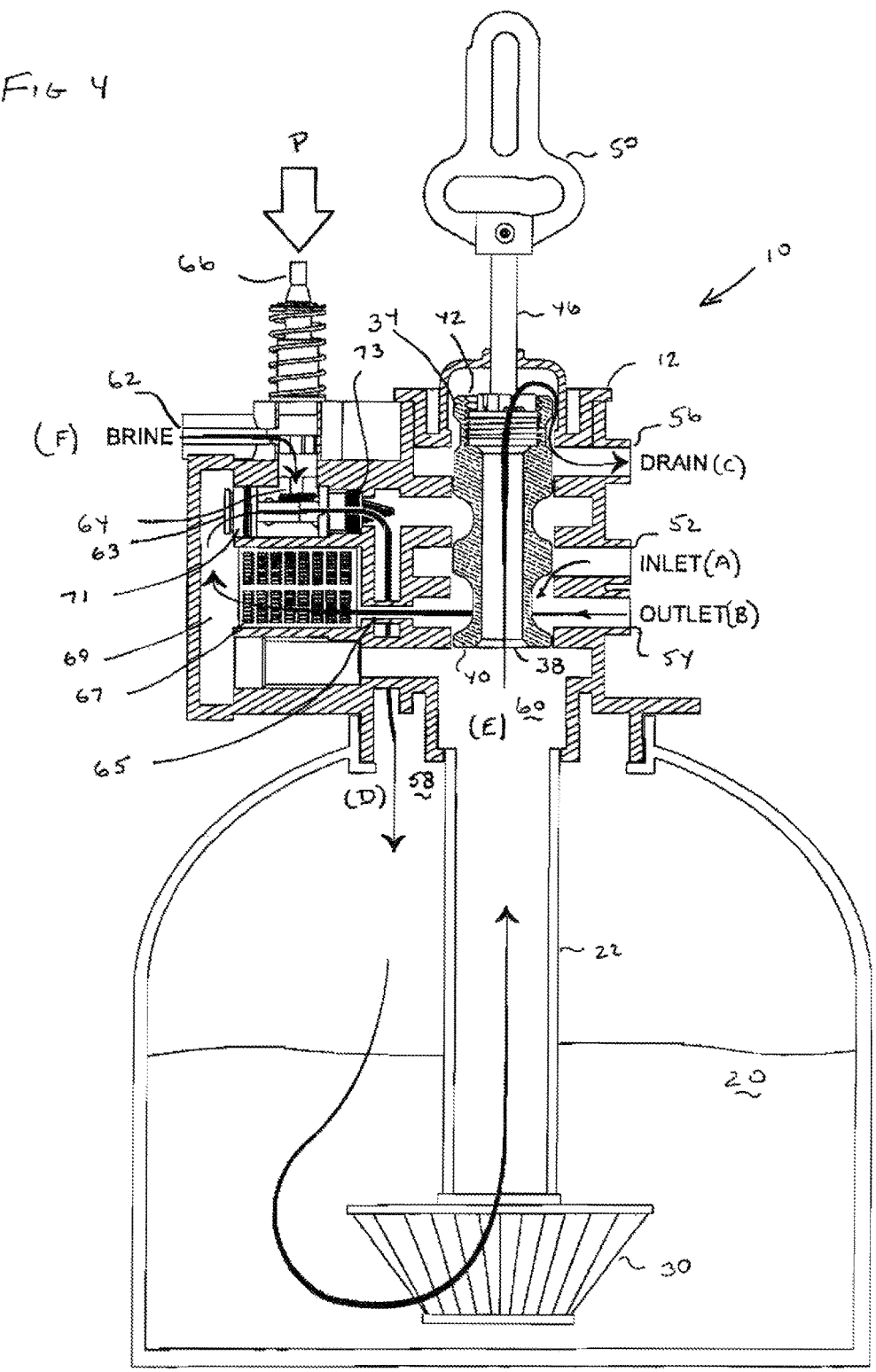
FIG. 4 is a view similar to FIG. 1 which shows the control valve in another operating condition.

At the conclusion of the backwash function, the exemplary valve controller is operative to change the condition of the valve to that shown in FIG. 4. In the position of the piston 34 shown in FIG. 4, water under higher pressure from the inlet A as well as water pulled from the outlet B passes through the valve body to the first tank port D. In this condition, the exemplary valve controller is operative to depress the plunger 66 and move the movable valve member 64 so as to open a flow path in the valve body. This causes the brine port F to enable brine solution to be received by the valve from the brine tank, into the flow of water as it moves through the valve body and to the first tank port D at the top of the tank. In exemplary embodiments brine delivered to the brine port F may be pressurized through operation of a pump or similar device so as to facilitate the delivery of the brine into the valve body. In other arrangements, the brine may be moved into the flow of water through venturi action or other suitable action which is suitable for causing the brine to be moved into the brine port F and mixed in the water that is flowing through the flow cavities of the valve body 12.

In the exemplary arrangement, treated water flows through the passage 65 and the screen 67 into the chamber 69. From the chamber, the water flows through an opening 63 and into the interior of the body of the injector 71. The incoming brine from brine port F mixes with the water in the interior of the injector body and flows in the direction in which flow is permitted past the check valve 73 at the inward end of the injector 71. Once the brine containing water passes the check valve 73, it flows through an interior passage of the valve to the first tank port D.

In the position of the exemplary valve and valve controller represented in FIG. 4, water including the fresh water softener salt solution passes through the area at the top of the tank and passes downward into the resin material 20. The ions from the brine material flow into and migrate in the resin material, regenerating the supply of sodium ions therein and displacing the calcium, magnesium and other ions currently bonded to the resin particles therein. The water and the ions that are displaced from the resin material pass through the strainer 30 at the bottom of the tube 22 and flow upwardly to the second tank port E at the bottom of the valve. In this position of the valve piston 34 the water passing upwardly through the tube 22 passes through the longitudinal flow cavity 38 of the piston, through the flow cavity at the top of the valve body and out the drain port C. As a result, undesirable material is washed out of the resin and moved to the drain port.

Figure 5:
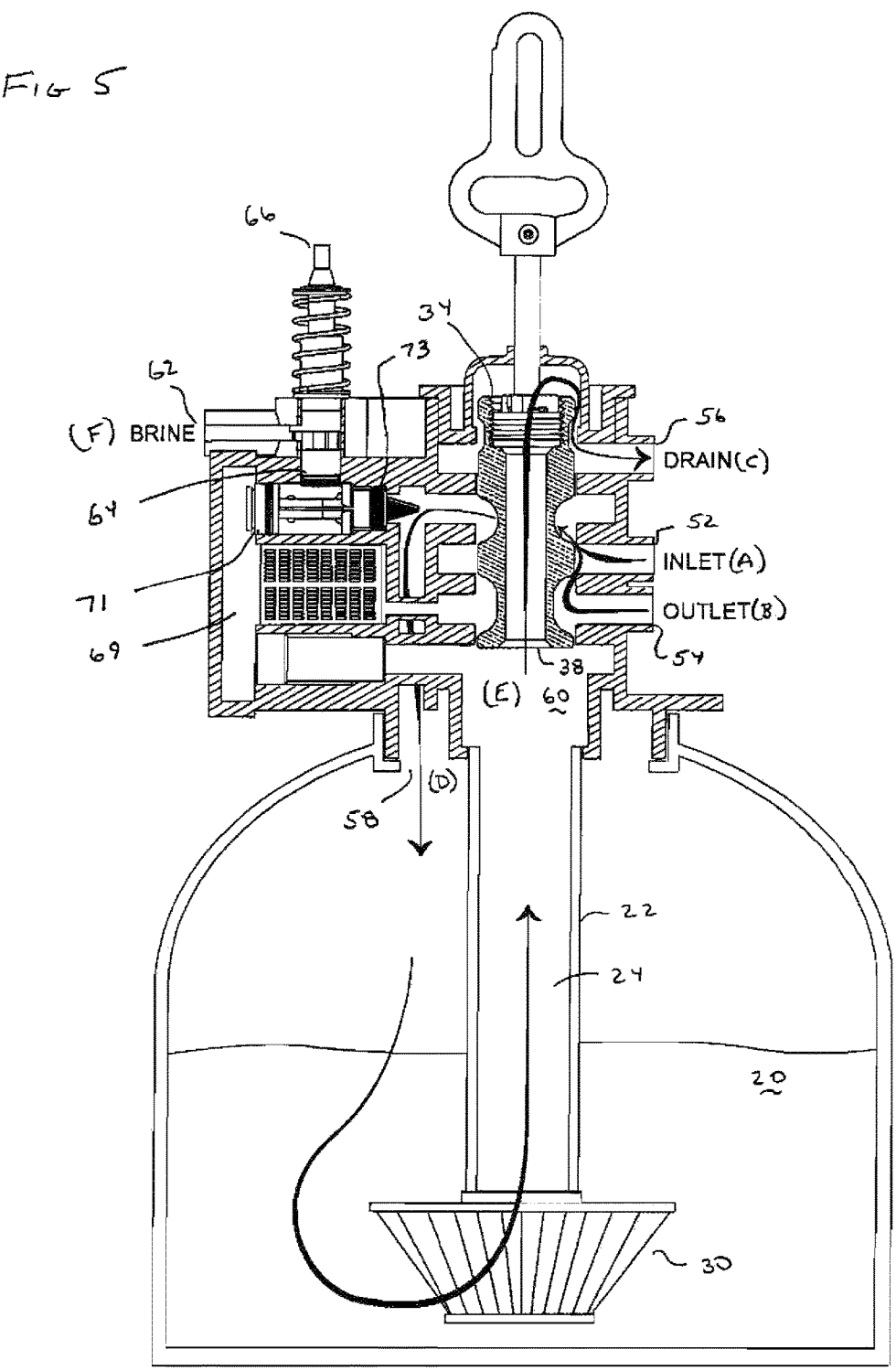
FIG. 5 is a view similar to FIG. 1 which shows the control valve in another operating condition.

The condition of the valve represented in FIG. 4 is maintained through operation of the valve controller for a period of time sufficient to draw an amount of brine into the tank that will regenerate the resin. Thereafter the exemplary valve controller operates to cause the plunger 66 to no longer be positioned to cause the movable valve member 64 to enable brine to enter the valve body through the brine port F. As represented in FIG. 5, the valve controller changes the position of piston 34 such that untreated water from the inlet A and water otherwise received from the outlet B pass through the valve body to the first tank port D. The check valve 73 of the injector 71 prevents flow to chamber 69 through the injector. The water which no longer has the new brine mixed therein passes downwardly through the bed of resin material 20 through the strainer and into the tube conduit 24 within the tube 22.

In this condition of the exemplary valve, the water from the tube conduit passes upwardly through the tube 22 and the second tank port E, through the longitudinal flow cavity 38 in the piston and outwardly to the drain port C of the valve body. Such flow through the resin provides a rinse function which is operative to cause any remaining regenerate brine material in excess of that which is captured within the resin material to be rinsed out and passed to the drain. The condition of the valve shown in FIG. 5 is maintained through operation of the valve controller for a sufficient time to clear the excess regenerate material from the tank. This may be done in some embodiments on a timed basis or other basis sufficient to accomplish the function.

Generally after regenerating the resin material as just described, the exemplary valve is returned by the valve controller to the flow condition which is shown in FIG. 1. In this condition, untreated water enters the inlet A of the valve body, passes through the valve body to the first tank port D. The water then passes through the resin 20 where it undergoes water treatment to remove undesirable materials and ion exchange is accomplished. The treated water then passes upwardly through the tube 22 to the second tank port E. The treated water then passes out of the valve body through the outlet B through which it is delivered to the water distribution system in the building and the water use devices. Generally the valve remains in this condition until the cycle for regenerating the resin material needs to be repeated.

It should be noted that in the exemplary embodiment the position of the piston 34 in the rinse position of the valve shown in FIG. 5, is immediately linearly longitudinally adjacent to the piston position 34 when the valve is in its usual service mode of operation in which untreated water is treated by flowing through the resin in the resin in the tank 14. This configuration minimizes the introduction of untreated water or other undesirable material when the condition of the valve is changed between the last step in which the remaining regenerate material is rinsed and removed from the tank, and the valve causes the system to go back into normal service mode. Of course it should be understood that this approach is exemplary and in other arrangements other approaches may be used.

The exemplary control valve 10 further provides the function of a valve shutoff which in the exemplary system separates the water treatment tank 14 from the untreated water inlet A. This function can avoid the need for an external shutoff valve to prevent untreated water from flowing to the control valve and the tank.

Figure 6:
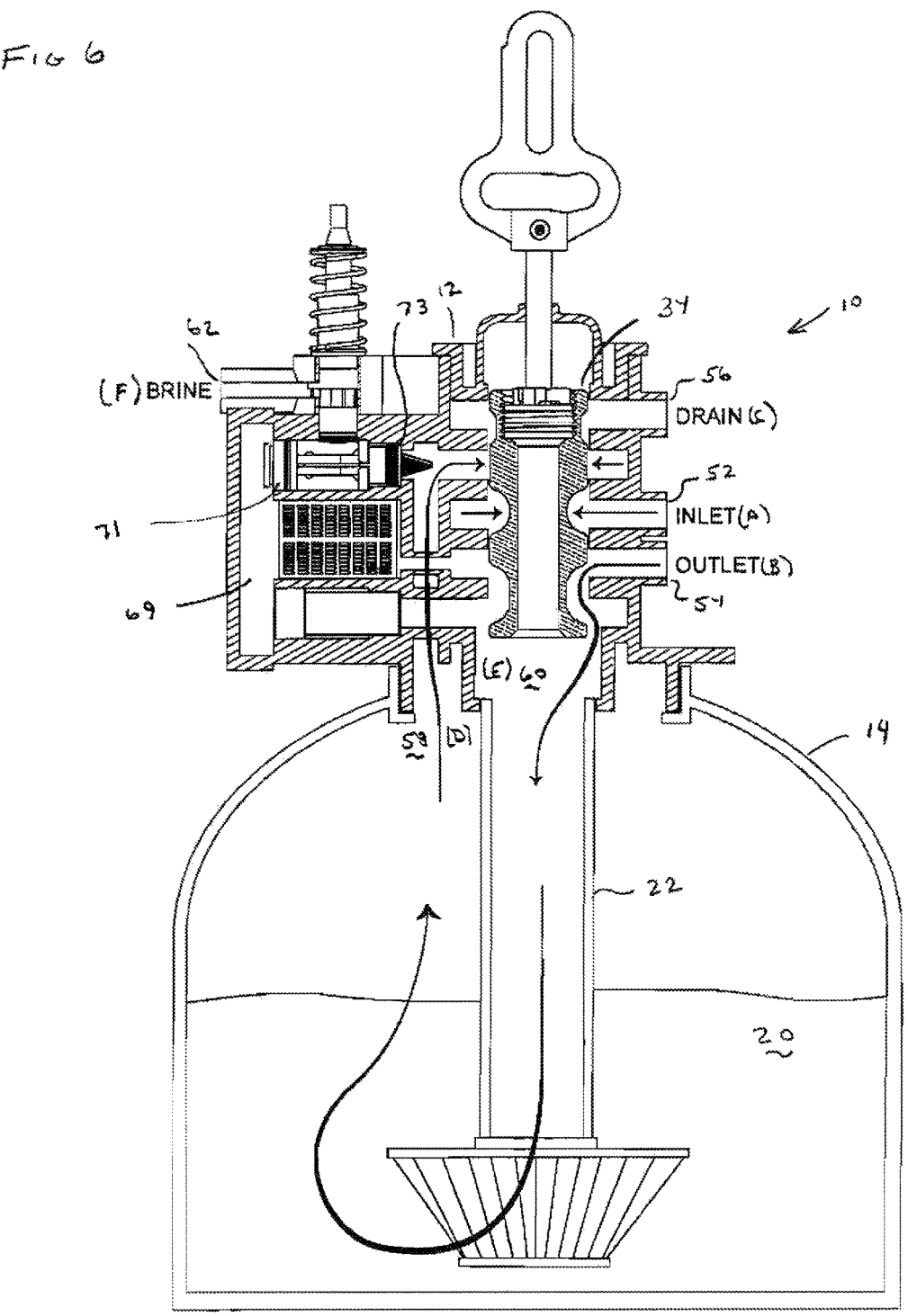
FIG. 6 is a view similar to FIG. 1 showing the control valve in another operating condition in which flow of liquid into the valve is shut off.

FIG. 6 represents the condition of the exemplary valve 10 in a shutoff condition. As can be appreciated in the exemplary system when it is desired to shut off the flow of untreated water to the valve and to the tank, the valve controller operates to cause the piston 34 to be moved to the position shown in FIG. 6. In this position of the piston 34, the flow of untreated water into the inlet A is stopped by the position of the piston in which the annular flow cavities then connected to the inlet are not open to any other flow cavities within the valve.

As represented in FIG. 6, the first tank port D is likewise in communication with a flow cavity within the valve that is not fluidly connected to any other flow cavity. In this position of the piston, the water outlet B is in operative connection with the second tank port E. Water pressure is effectively maintained at the outlet B unless a water use device is turned on which reduces such pressure. As a result, flow is effectively discontinued on a selective basis through actuation of the valve controller. Of course it should be understood that this particular configuration is exemplary and in other embodiments, other configurations may be utilized for purposes of shutting off the flow between the water inlet A and the water outlet B.

A further feature of the exemplary embodiment of valve 10 when used in the exemplary water treatment system is the ability to operate the valve controller to allow incoming water to bypass the water treatment tank 14. For example in an exemplary system there are some situations such as when delivering water to an external spigot to wash off a sidewalk, irrigate plants and the like, when it may not matter that the water is untreated. Further in some situations the amount of water required for a particular activity may be relatively large compared to the amount of water that is used in circumstances where it is highly desirable for the water to be treated by having been treated by having passed through the tank 14.

Figure 7:
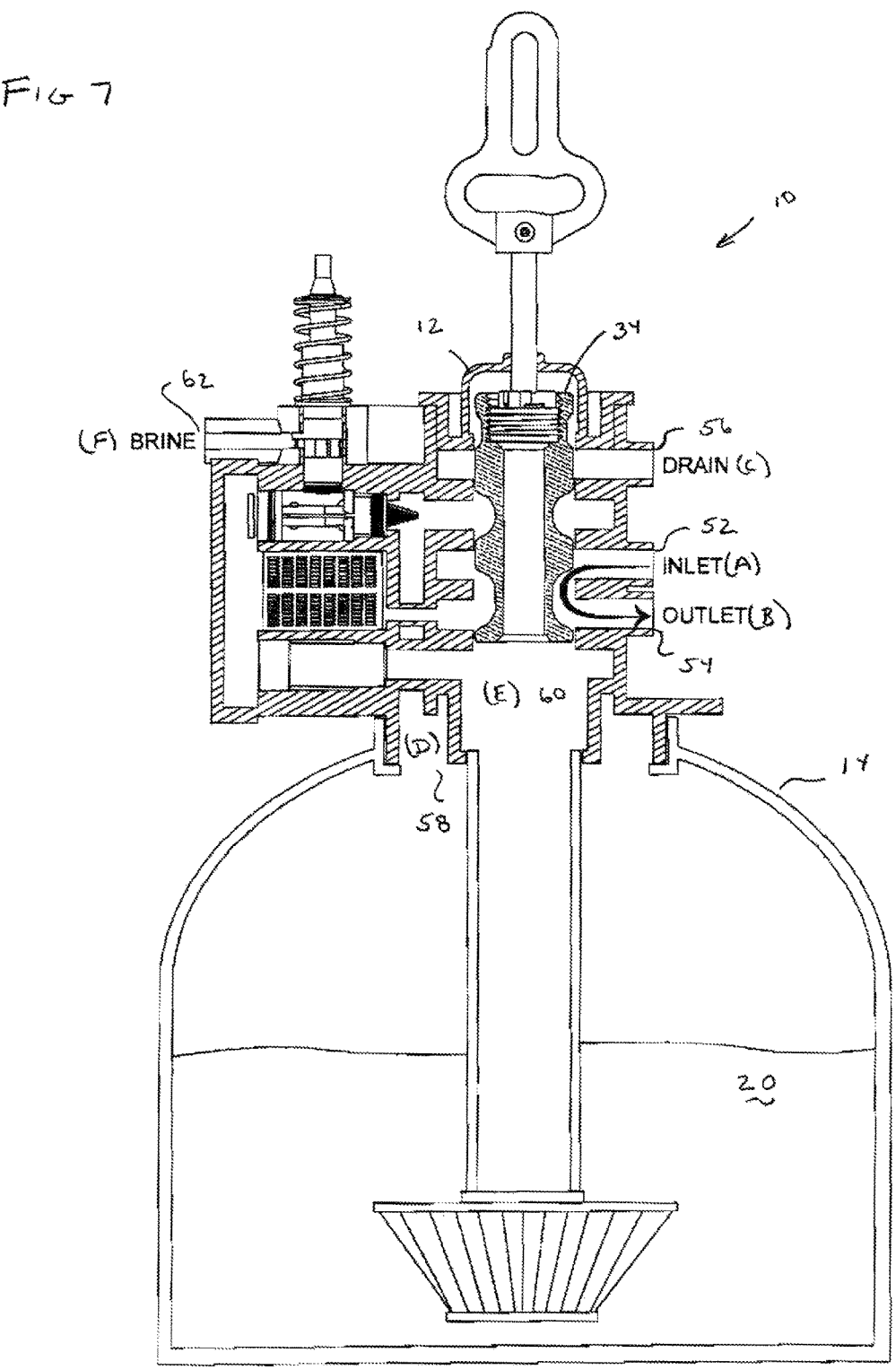
FIG. 7 is a view similar to FIG. 1 which shows the flow of liquid through the treatment tank bypassed through the valve.

In situations where it is desirable to deliver untreated water for use by a particular device, the exemplary valve controller may be operated to cause the piston 34 in the valve 10 to be moved to the longitudinal position shown in FIG. 7. In this piston position, untreated water which is delivered at the inlet A is passed through the valve body directly to the outlet B without passing through the resin material 20 in the tank. In this way, the untreated water is provided to the water use devices for as long as untreated water is desired. After the activity is accomplished for which the untreated water will be used, suitable signals can be delivered to the valve controller to return the valve condition to that shown in FIG. 1 in which the water is again treated by passing through the tank.

Of course it should be understood that the valve configuration shown is exemplary and in other embodiments other valve configurations having different valve body arrangements, valve element configurations, ports and other structures may be utilized. Further, while the exemplary embodiment has been described in connection with a water treatment process, other embodiments may be utilized in connection with other types of fluid treatment equipment and processes.

The exemplary embodiment of the valve controller includes features that enable the valve controller housing to be readily installed in connection with the valve. Further this exemplary construction enables the valve controller to be readily replaced or serviced.

Figure 8:
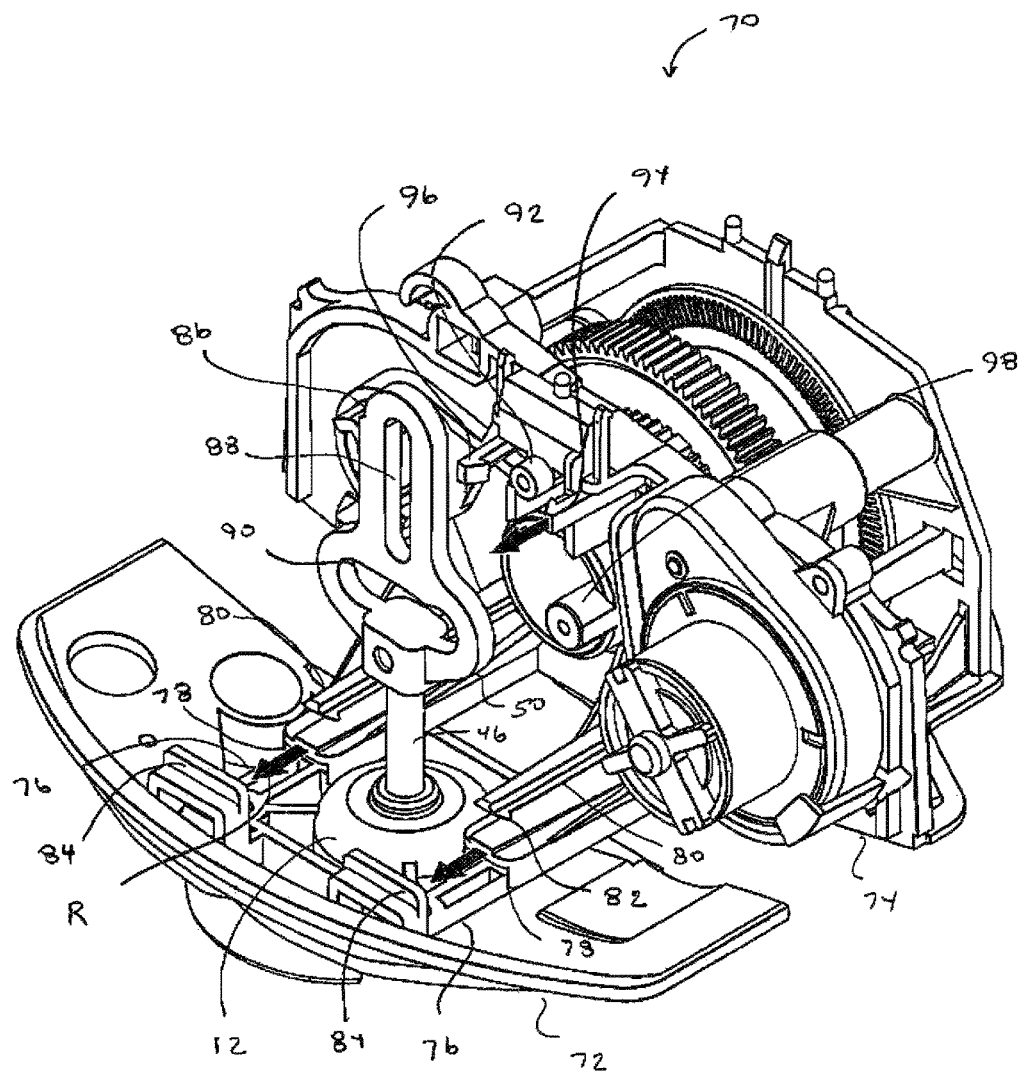
FIG. 8 is an isometric view showing an exemplary valve controller housing and a valve base being moved toward an operative position.
Figure 9:
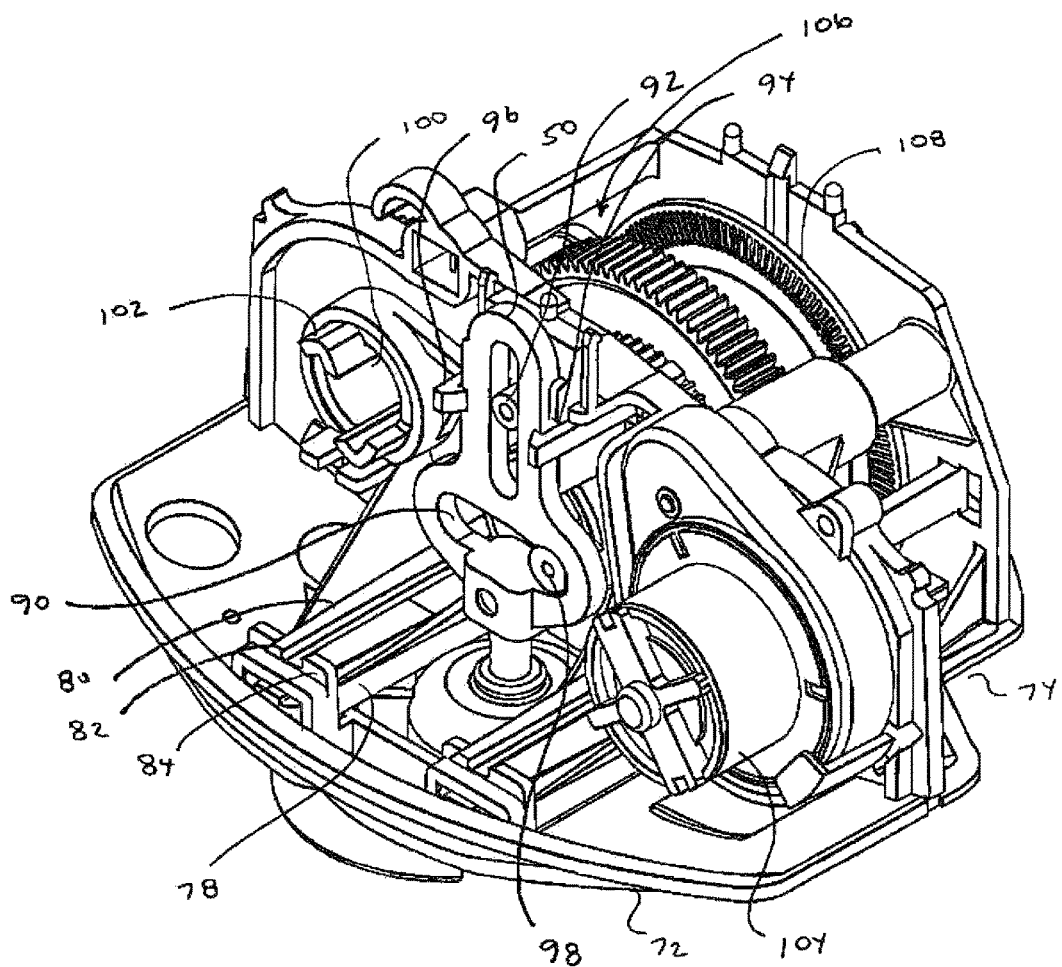
FIG. 9 shows the valve base and valve controller housing in an operative position.

An exemplary embodiment of the valve controller 70 is represented in FIGS. 8 and 9. The exemplary valve controller is operative to selectively move the actuator bracket 50 and the piston rod 46 to position the piston 34 longitudinally within the valve body 12 in the manner previously discussed herein. The actuator 70 may include the features and devices of the incorporated disclosures so as to carry out this function. Of course it should be appreciated that in other embodiments, other types of structures, devices and mechanisms may be utilized for purposes of providing selectively controlled movement of one or more valve elements.

In the exemplary embodiment of the controller 70 a valve base 72 is configured to be in operative connection with the valve body 12 of the valve 10. A valve controller housing 74 is configured to be selectively engageable with the valve base and placed in an operative position in which the valve controller may change the condition of the valve. The valve controller housing 74 is also configured to be readily disengageable from the valve base for reconfiguration, replacement or repair.

In the exemplary arrangement, the valve controller housing and the valve base include interengaging projections and slots to provide for the secure engagement and selective disengagement of the valve base and housing. Although it should be understood that the interengaging projections and slots may be in fixed connection with either of the engageable components, in the exemplary embodiment the valve base includes a pair of elongated rail projections 76. The pair of elongated rail projections 76 extend on opposed sides of the piston rod 46 and extend generally perpendicular to the longitudinal direction in which the piston rod is moveable.

The exemplary elongated rail projections are configured to be engaged in captured relation by elongated recessed slots 78. Elongated slots 78 extend in portions of the valve controller housing 74. The exemplary slots 78 are configured such that the rails 76 once extended therein are captured and immovable in all directions except along the direction of the rail projections designated by arrows R in FIG. 8. The secure engagement of the projections and slots may be achieved in different embodiments by interengaging tabs, flanges or other structures on the projections and slots which only enable such items to be engaged and disengaged by movement along the direction of arrows R.

The exemplary valve controller housing 74 further includes a pair of deformable members 80. Deformable members 80 each terminate at a hook 82. Each hook 82 is configured to engage and hold tabs 84 that are operatively connected with at least one wall when the valve controller housing is in the operative position as shown in FIG. 9. It should be understood, however, that the hook and tab configuration shown is exemplary and in other arrangements, the configuration may be reversed such that the hooks are included in engagement with the valve base and the structures for engaging the hooks are included on the valve controller housing. Further, other structures may be utilized for selectively holding and releasing the valve base and valve controller housing in the operative position.

In the exemplary arrangement, the actuator bracket 50 is configured to be readily operatively engaged with and disengaged from the structures which operate to selectively move the actuator bracket which are part of the valve controller housing. In the exemplary arrangement, the actuator bracket 50 includes a longitudinally elongated guide yoke portion 86. Guide yoke portion 86 includes a longitudinally elongated guide slot 88. The exemplary actuator bracket is further configured to include an actuator recess 90. Actuator recess 90 includes an elongated actuator slot that is elongated in a direction transverse to the longitudinal direction.

In an exemplary arrangement, the guide slot 88 in the guide yoke portion is configured to accept a guide pin 92 on the housing in movable relation therein. In the exemplary arrangement, the valve controller housing 74 includes a pair of deformable holding projections 94. The holding projections are spaced apart in symmetric relation relative to guide pin 92 and are sized to enable the guide yoke portion 86 to extend in movable relation between the holding projections. In the exemplary arrangement, each of the holding projections includes an angled hook end 96. Hook ends 96 of the holding projections 94 extend in facing relation and are configured to enable the guide yoke portion to be moved between the holding projections and held between the projections by the hook ends. As a result, the guide yoke portion is enabled to move in a longitudinal direction while positioned between the holding projections and in guided relation in the longitudinal direction by the guide pin 92. Further the hook ends 96 serve to prevent the guide yoke portion from moving out of the area between the holding projections and being disengaged from the guide pin.

It should be understood that this approach is exemplary and in other arrangements, one or more guide pins may be positioned on an actuator bracket which engage with slots or other openings in the housing. Further other structures may be utilized for engaging the actuator bracket or similar structures in releasable movable connection.

Further in the exemplary arrangement, the actuator recess 90 is configured to receive therein an actuator pin 98. Actuator pin 98 of the exemplary arrangement is operative to be selectively moved in an arcuate path responsive to operation of the valve controller 70. In the exemplary arrangement, the actuator pin 98 is positioned on a rotatable member that is selectively rotated so as to control the relative vertical position of the actuator pin, and thus control the movement and longitudinal position of the piston 34 through longitudinal movement of the actuator bracket 50.

In the exemplary arrangement, the actuator pin is selectively moved in an arcuate path which causes the pin 98 to move relatively transversely within the actuator recess 90. The selective positioning of the actuator pin 98 along its arcuate path as determined through operation of the valve controller 70 is usable to selectively position the actuator bracket 50 and the piston 34 in operative connection therewith, in the desired positions to achieve the desired flow conditions through the valve.

Further, the exemplary arrangement enables the bracket to be readily operatively disengaged from the valve controller housing 74. As can be appreciated, disengagement of the deformable members 80 from the tabs allows relative movement of the valve base 72 and the valve controller housing 74 along the direction of arrow R and in an opposed direction from when the base and housing are being engaged. In the exemplary arrangement, the holding projections 94 are movable and deformable to enable the hook ends 96 to release the guide yoke portion 86 of the bracket 50 from being held in intermediate relation of the holding projections 94. In addition, in the exemplary embodiment the actuator pin 98 may be moved out of the elongated actuator slot 90. Thus the actuator housing and the components attached thereto may be readily disengaged from the valve base 72. Thereafter a new valve controller housing 74 may be readily engaged with the valve base 72 and the actuator bracket 50. Such replacement may be done for repair or maintenance purposes. Alternatively an alternative valve actuator housing may be installed to provide additional or different features and functions for operation of the valve and related components such as the exemplary water treatment system. For example a valve controller that operates based on wired connections with other system components may be replaced with a valve controller that communicates wirelessly with other components, and vice versa. Alternatively the valve controller may be replaced to convert the valve and associated equipment to operate via a different method of operation. Of course it should be understood that these approaches are exemplary and in other embodiments, other approaches may be used.

Further in the exemplary arrangement as shown in FIG. 9 the valve controller housing 74 includes a rotatable member 100 which includes cam surfaces 102 thereon. The cam surfaces 102 are configured to operatively engage the plunger 66 and displace the plunger so as to control the movement of the movable valve member 64 within the valve body. In the exemplary arrangement the rotatable member 100 and cam surfaces 102 are configured so that the valve controller housing 74 can be disengaged from the valve base 72 without interference with the plunger member 66. This further facilitates the ready installation and replacement of the valve controller housing. As can be appreciated, the exemplary valve controller includes a pair of cam surfaces 102 which enables opening the movable valve member twice during a single rotation of the rotatable member. This may correspond, for example, to operation of the valve and its associated equipment in connection with a method that requires opening of the movable valve element 64 two times during a particular operation cycle such as the one previously described. Of course it should be understood that in other embodiments, different numbers of cam surfaces may be utilized. Further other exemplary arrangements may include valves with additional valve elements and cam members so as to enable the introduction of other liquids and fluids into the valve at various selected cycle times during operation of the valve and the associated equipment.

As represented in FIG. 9, the exemplary valve controller includes a motor 104. The motor 104 is in operative connection with a transmission generally referred to as 106. The transmission of the exemplary embodiment includes a plurality of connected gears or similar motion transmission devices that are selectively moved through operation of the motor 104. The transmission 106 of the exemplary arrangement is operative to move the actuator pin 98, rotatable member 100 and other structures which control the positioning of the valve components in a coordinated manner so as to achieve the desired coordinated operation of the valve structures. Further the exemplary valve controller includes an encoder 108. The encoder 108 moves in coordinated relation with one or more components of the transmission. One or more sensors (such as an optical sensor) is in operative connection with the encoder through operation of control circuitry such as is described in the incorporated disclosures. The encoder and associated sensor or sensors may be utilized to determine the then current status and/or position of the valve components so as to enable the valve controller to selectively move the various components associated with the valve in the desired manner. Of course it should be understood that the transmission, motor, encoder and other structures of the valve controller shown are exemplary and in other embodiments, other types of valve controller arrangements may be utilized.

Figure 10:
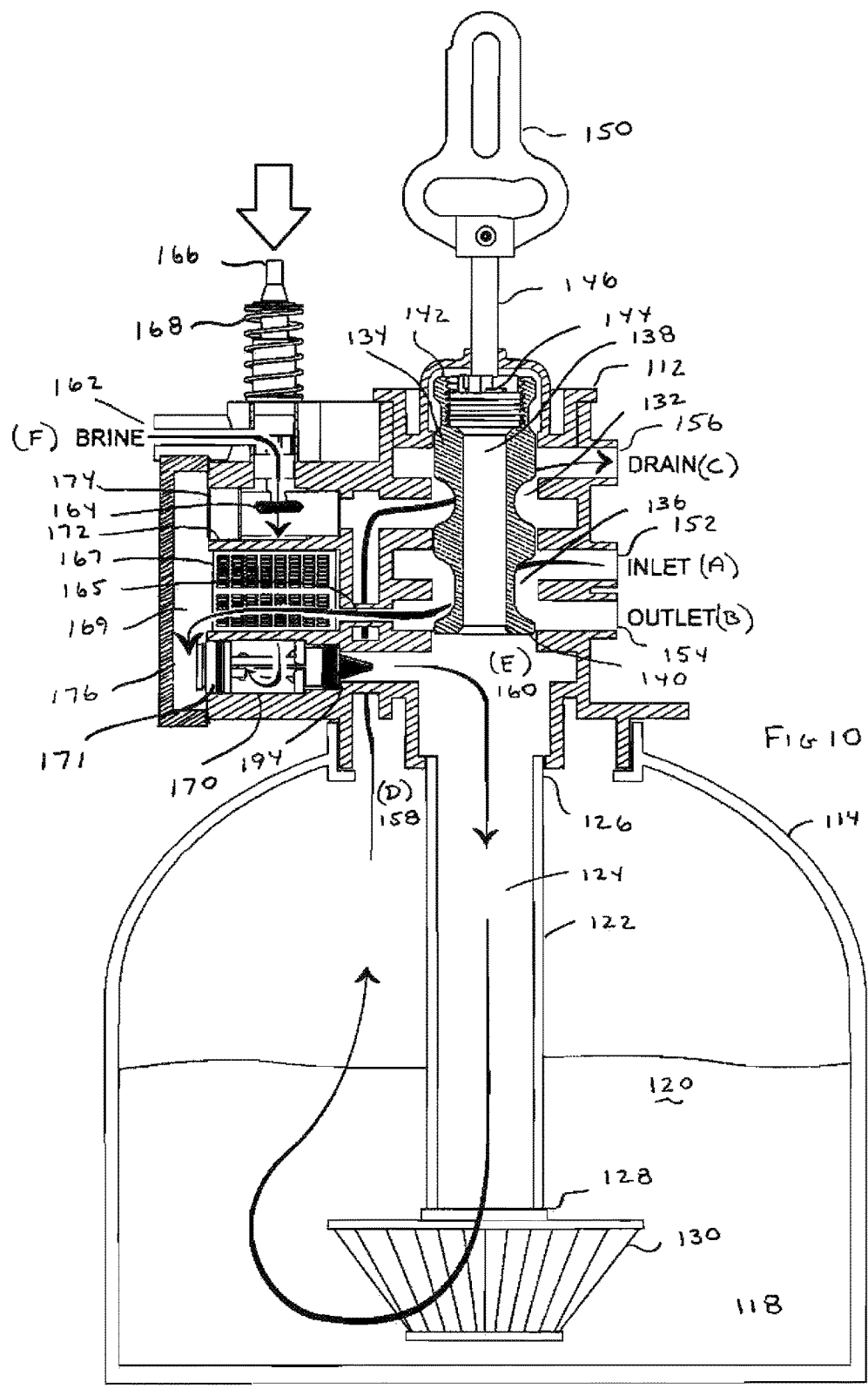
FIG. 10 is a schematic cross-sectional view of an alternative exemplary control valve.

FIG. 10 shows schematically an alternative embodiment of a control valve generally indicated 110. Control valve 110 is generally similar to control valve 10 previously described except as otherwise mentioned. Control valve 110 corresponds to a control valve that has been reconfigured so as to enable the carrying out of different functional processes as discussed herein.

Control valve 110 includes a valve body 112. Valve body 112 is configured for operative attachment to the water treatment tank 114. This may be for example by releasable threaded connection. In exemplary arrangements valve body 112 may be identical to body 12. Like the previously described water treatment tank, the exemplary tank has a top portion 116 and a bottom portion 118. The exemplary tank houses water treatment material such as a resin material 120. The resin material may be one of the types like those previously described. Of course other types of water treatment materials or combinations of materials may be used in other embodiments. Further it should be understood that the water treatment process performed using the control valve is merely one example of an application for the particular control valve arrangement.

The exemplary water treatment tank includes therein a tube 122 which provides a conduit 124 between the top and bottom portions of the tank. The top end of the tube 126 is operatively connected to the valve body 112. The bottom end of the tube 128 is in operative connection with a strainer 130.

Similar to the previously described control valve 10, the valve body 112 includes a generally cylindrical, longitudinally extending bore 132. A piston 134 is selectively movable in the longitudinal direction within the bore 132. It should be noted that the exemplary piston 134 has the same configuration as piston 34 of the previously described embodiment. As in the prior embodiment the exemplary valve is configured to enable the piston to be changeable.

As discussed in connection with the previously described embodiment, piston 134 includes a plurality of annular recesses which define annular flow cavities 136. Annular flow cavities also generally surround the bore and are longitudinally spaced within the body of the valve. Piston 134 also includes a longitudinal flow cavity therethrough 138. Piston 134 includes a first longitudinal end 140 and a second longitudinal end 142. As in the case with the previously described embodiment, the second longitudinal end includes a threaded portion adjacent the second longitudinal end 144 which is releasably engageable with a coupling 144. The coupling 144 of the exemplary arrangement provides for operative releasable connection of the piston 134 and a piston rod 146. As with the prior embodiment, the coupling 144 enables fluid to flow therethrough through the longitudinal flow cavity 138 of the piston.

In the exemplary arrangement associated with the control valve 110, the piston 146 is in operative connection with an actuator bracket 150. Actuator bracket 150 is configured to be moved by a valve controller which may be similar to the valve controller 70 previously discussed. Of course it should be understood that in other embodiments, other types of valve controllers may be used.

Like previously described control valve 10, control valve 110 further includes an inlet port 152 which is labeled A for purposes of brevity herein. The valve also includes an outlet port 154 labeled B. The exemplary valve further includes a drain port 156 labeled C. Valve 110 further includes a first tank port 158 labeled D and a second tank port 160 labeled E. The exemplary valve 110 further includes a brine port 162 (labeled F). The brine port F similar to the previously described embodiment, is connected to a fluid passage within the valve which is opened and closed through selective movement of a movable valve member 164. The movable valve member 164 is moved between open and closed positions through movement of a plunger 166 which is biased toward the valve member closing position by a spring 168. As is the case with the prior described embodiment, the plunger 166 may be selectively moved between the open and closed positions of the valve through operation of the valve controller. This may be done by engagement with cam surfaces such as cam surfaces 102 previously described. Of course in other arrangements, other approaches may be used.

Similar to the previously described valve, valve 110 includes a flow passage 165 which is fluidly connected to a chamber 169. A screen 167 is positioned such that fluid passes through the screen 167 to reach the chamber 169.

Valve 110 includes a passage 170 similar to passage 59 that is disposed below the passage 165 as shown and a further passage 172 similar to passage 75 that is disposed above passage 165. An injector 171 that is similar to injector 71 is positioned in passage 170. The injector 171 includes a check valve 194. A plug 174 which may be similar to the plug 61 of the previously described embodiment is positioned in passage 172. In the exemplary embodiment a fluid passage that is not separately shown extends between the passage 172 and passage 170. This fluid passage is separate from the fluid passage 165 and enables the brine port F to communicate with both passages 170 and 172. In this exemplary arrangement, the plug 174 positioned in the passage 172 enables the brine port F to be in communication with the passage 170 and the injector 171. This enables the injector body to be in fluid communication with the brine port when the valve member 164 is open.

In the exemplary valve 110 a removable cover 176 closes the chamber 169. In the exemplary arrangement suitable sealing elements such as gaskets and fastening members such as screws are provided to enable holding the cover to the rest of the valve body and for maintaining the chamber 169 in fluid tight engagement therewith. In the exemplary arrangement the cover 176 enables selectively accessing the passages 170 and 172 as well as the plug and injector that may be positioned therein. This enables the exemplary valve 110 to be configured such that the injector may be selectively positioned in either one of the fluid passages 170 or 172. Likewise the plug 174 can be selectively positioned in the other one of the passages 170 or 172 in which the injector 171 is not currently positioned.

Figure 11:
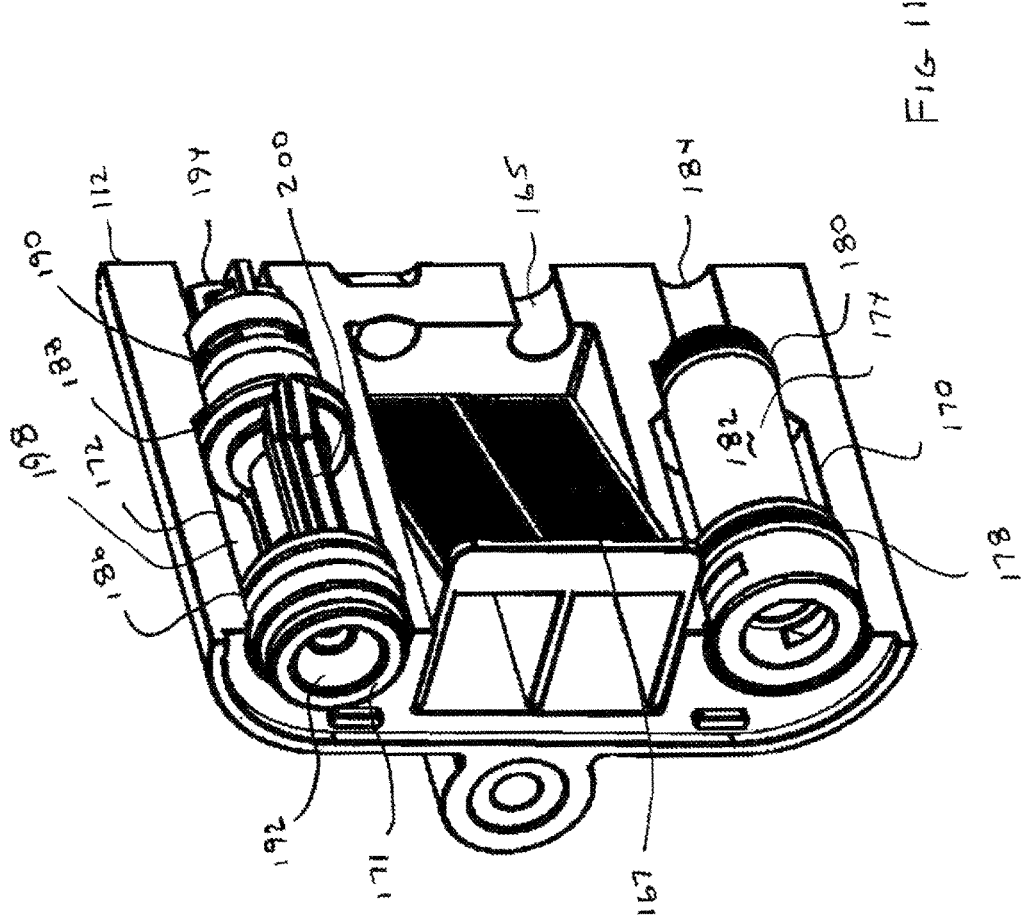
FIG. 11 is an isometric partial cutaway view of a portion of the valve associated with a changeable injector.
Figure 12:
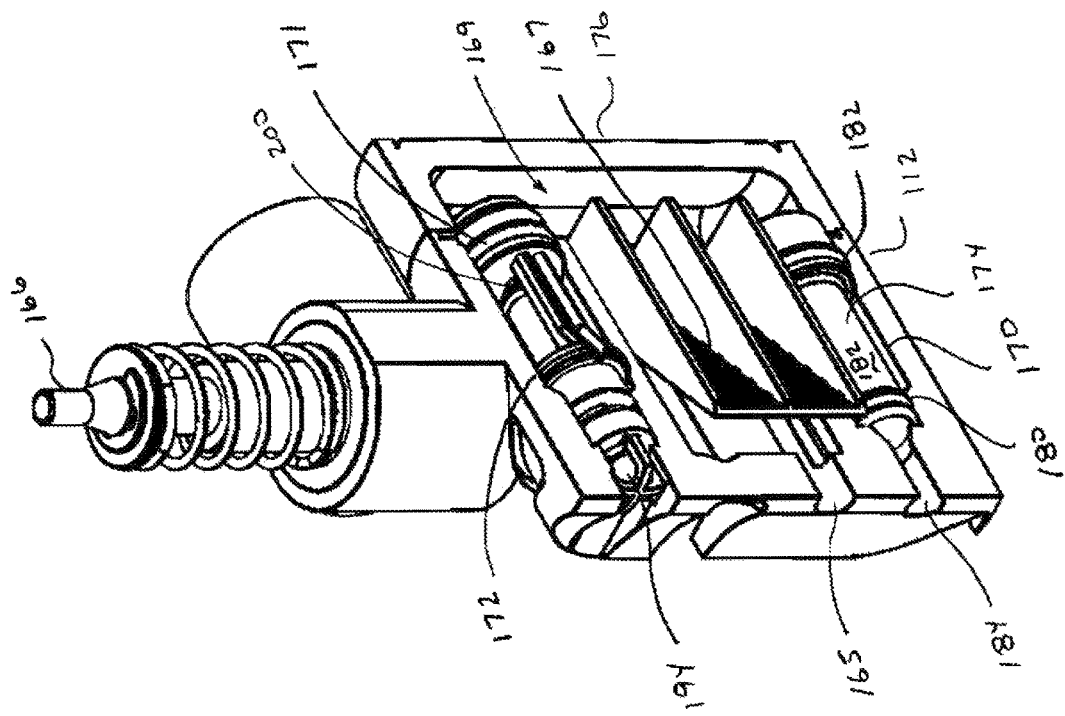
FIG. 12 is an opposite hand partial cutaway showing the portion of the valve in FIG. 11.

FIGS. 11 and 12 are cutaway views of the portion of the valve body 112 and the passages 170 and 172. In the arrangement shown in FIGS. 11 and 12, the injector 171 is shown positioned in passage 172 while the plug 174 is positioned in passage 170. This corresponds to the configuration of the injector and plug shown in valve 10 that has the positions of the injector and plug reversed from that shown in valve 110. Thus as can be appreciated, the exemplary embodiment of valve 110 enables a person assembling the valve initially to selectively position the injector body 171 and plug 174 in either passage 170 or passage 172 as is appropriate for the operation of the particular control valve. Further this exemplary configuration may enable a service technician or person modifying the valve to remove the cover and change the positions of the injector body and the plug so as to modify the operational capabilities of the valve. Further in other alternative arrangements the valve may be configured to have plugs positioned in both of the passages 170 and 172. This might be done, for example, to have a valve that operates not to have brine solution or other material introduced into the liquid that passes through the valve. Alternatively in still other arrangements injectors or other elements may be positioned in both of the fluid passages. This might be done, for example, in valve configurations where in multiple positions of the piston, it is desirable to introduce brine solution or other material into the liquid flow.

It should also be appreciated that alternative arrangements may be utilized in connection a valve configuration like that described. For example, check valves or other arrangements may be utilized so as to allow fluid flow in an opposite direction from that permitted by the check valve of the injector so that fluid may be enabled to flow into the chamber 169 in certain longitudinal positions of the piston for producing a desired flow path. Further in other alternative arrangements, the chamber 169 may have multiple segregated areas so as to be in connection with additional ports or flow paths through the valve. Such capabilities may provide additional flow alternatives to the valve which enable the valve to provide additional capabilities. As can be appreciated, those skilled in the art can develop numerous changeable valve configurations suitable for different processes and equipment from the description provided herein.

Further in the exemplary arrangement the plug 174 includes disposed annular seals 178 and 180. These disposed annular seals are comprised of resilient material that engage the adjacent walls of the flow passage so as to provide fluid tight engagement therewith. However, as can be appreciated, the body portion 182 of the plug 174 that extends between the seals is spaced inwardly from the annular wall bounding the passage 170. This provides the capability for fluid to occupy and flow in the area between the annular wall bounding the passage and the body portion 182 without the fluid being able to flow directly into the chamber 169 or the passage 184 which can fluidly connect with the area adjacent to the second tank port 160. As can be appreciated, this exemplary construction of the plug 174 when positioned in the passage 172 as represented in FIG. 10 enables the brine solution which enters the passage 172 to flow around the body portion 182 of the plug member and into the chamber 170 to reach the injector 171.

As also shown in FIGS. 11 and 12, the exemplary injector 171 includes disposed annular resilient seals 186, 188 and 190 which engage in sealing relation the adjacent annular wall bounding the passage 172. The exemplary injector includes a liquid inlet 192 similar to opening 63 at a first end, and an outlet from the check valve 194 at the opposed end. In the exemplary arrangement the seals 186 and 188 bound an area 198 which can be filled with the brine solution which is received therein when the valve member 164 is open. Brine in the area 198 is drawn through openings 200 in the injector body as liquid flows therethrough. This causes the brine solution to be mixed with the liquid as it flows through the injector body in the manner previously discussed. Treated water can also be delivered from area 198 to the port F in an appropriate valve condition like that previously discussed. Of course it should be understood that this injector configuration is exemplary and in other valve and system arrangements, other approaches and configurations may be used.

In the exemplary system used in conjunction with valve 110 and shown in FIG. 10, the valve may be operated in conjunction with the water treatment tank in a manner similar to that previously described in connection with valve 10. However, in this exemplary embodiment, the selective positioning of the piston 134 by the valve controller associated with the valve enables the regeneration of the resin material 120 housed in the tank 114 via the upward flow of the brine solution rather than via a downward flow of the brine solution such as is described in connection with the operation of valve 10 and represented in FIG. 4. In the prior described example of the system used in connection with valve 10, the brine solution acts to regenerate the resin material housed in the tank by flowing from the upper surface thereof and to the bottom area and out the tube 22. In the operation of valve 110, regeneration is accomplished by distributing the brine solution initially from the bottom end of the tube 128 and having the solution migrate radially outwardly from the strainer and upwardly through the resin so as to provide for regeneration thereof. This may be more effective for some resin materials or tank configurations. Further it should be appreciated that because in some exemplary arrangements the piston 134 and valve body 112 may be identical to piston 34 and valve body 12 respectively, the change in capability from downflow regeneration to upflow regeneration may be accomplished by changing the respective positions of the injector and the plug within the valve body and changing the programming associated with the controller so that the controller positions the piston in a different position (e.g. the position shown in FIG. 4 for downflow and the position shown in FIG. 10 for upflow). This is useful in that the need for servicers and installers to have a stock of different valves for upflow and downflow regeneration can be avoided.

As can be appreciated, the method for configuring the exemplary valve for either upflow or downflow regeneration includes removing the cover 176 to access the chamber 169. The injector 171 and the plug 174 are positioned in the passages 170, 172 in the manner appropriate for the regeneration approach desired for the unit. The cover 176 is then installed to fluidly seal chamber 169. The valve controller 70 is programmed via one or more inputs through an appropriate input device such as a laptop or handheld computer, which inputs controller executable instructions that cause the piston to move to the appropriate position for the regeneration approach to be used. Further these method steps can be used to change the regeneration approach of an existing unit. This capability of the exemplary embodiments to be configured as desired without the need to change valve bodies, pistons or actuators can be useful and cost effective.

In the exemplary operation of the valve 110, the valve is enabled to operate in a manner similar to that discussed in connection with valve 10 and is represented in FIGS. 1-3 and 5-7.

It should be appreciated that in the exemplary arrangement, the plug 174 is configured so that treated water can be directed out of the brine port F in a manner similar to that described in FIG. 2 due to the configuration of the plug and the annular flow chamber which extends around the central body portion 182 thereof. As a result, treated water is enabled to be delivered from the area 198 of the injector body, to the brine port and into a brine tank holding material so as to produce a brine solution which can later be introduced to regenerate the resin in a manner like that discussed in connection with the prior embodiment.

When the resin material 120 in the water treatment tank 114 is to be regenerated, the piston 134 is moved to the position shown in FIG. 10. In this position, brine solution produced in the brine tank is drawn into the brine port F due to the opening of the movable valve element 164. The brine is drawn through the annular chamber around the central body portion 182 of the plug 174 and passes through the fluid passage into the area 198 of the injector body 171. Water flows from the inlet A through the passage 165 and into the chamber 169. From the chamber 169, the water flows through the injector body 171 where it is mixed with the brine solution and passes downwardly through the tube 122. The regenerate brine laden water then passes through the bottom of the tube 128 through the strainer and upwardly through the resin material 120 where it replaces the ions of contaminants that have been removed from the water previously treated. The released ions and other contaminants flow upwardly through the first tank port D and out through the drain C of the valve. This process is carried out for a sufficient time so as to regenerate the capabilities of the resin to remove undesirable materials from water which is passed therethrough after completion of the resin regeneration cycle. Of course it should be understood that these approaches and configurations are exemplary and in other embodiments, other configurations and process approaches may be utilized. Further it may be appreciated that the water treatment application for valve 110 and the structures and elements described in connection therewith is only one of many exemplary applications in which such elements and structures may be used.

Figure 13:
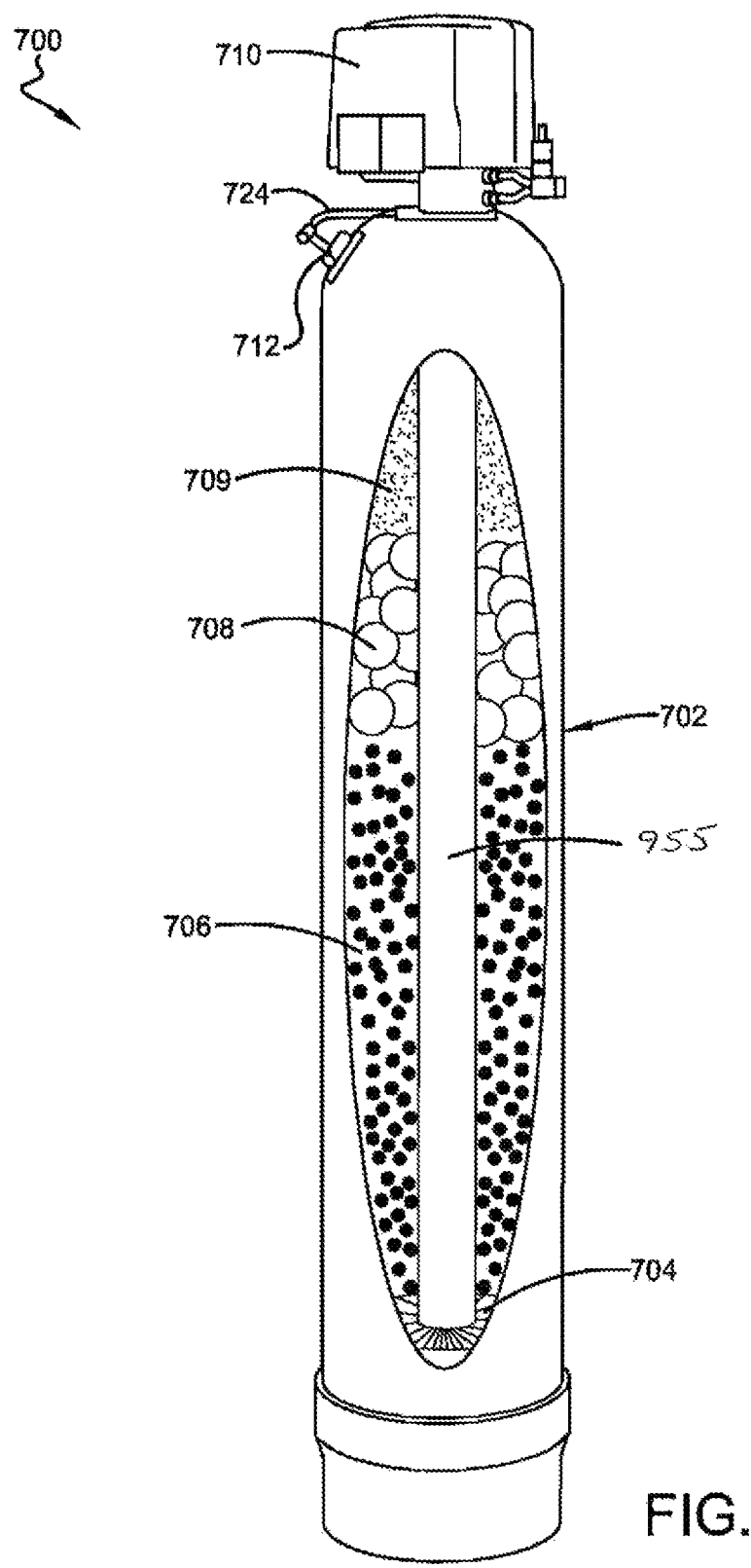
FIG. 13 is a cutaway view showing features of an exemplary liquid treatment system.
Figure 14:
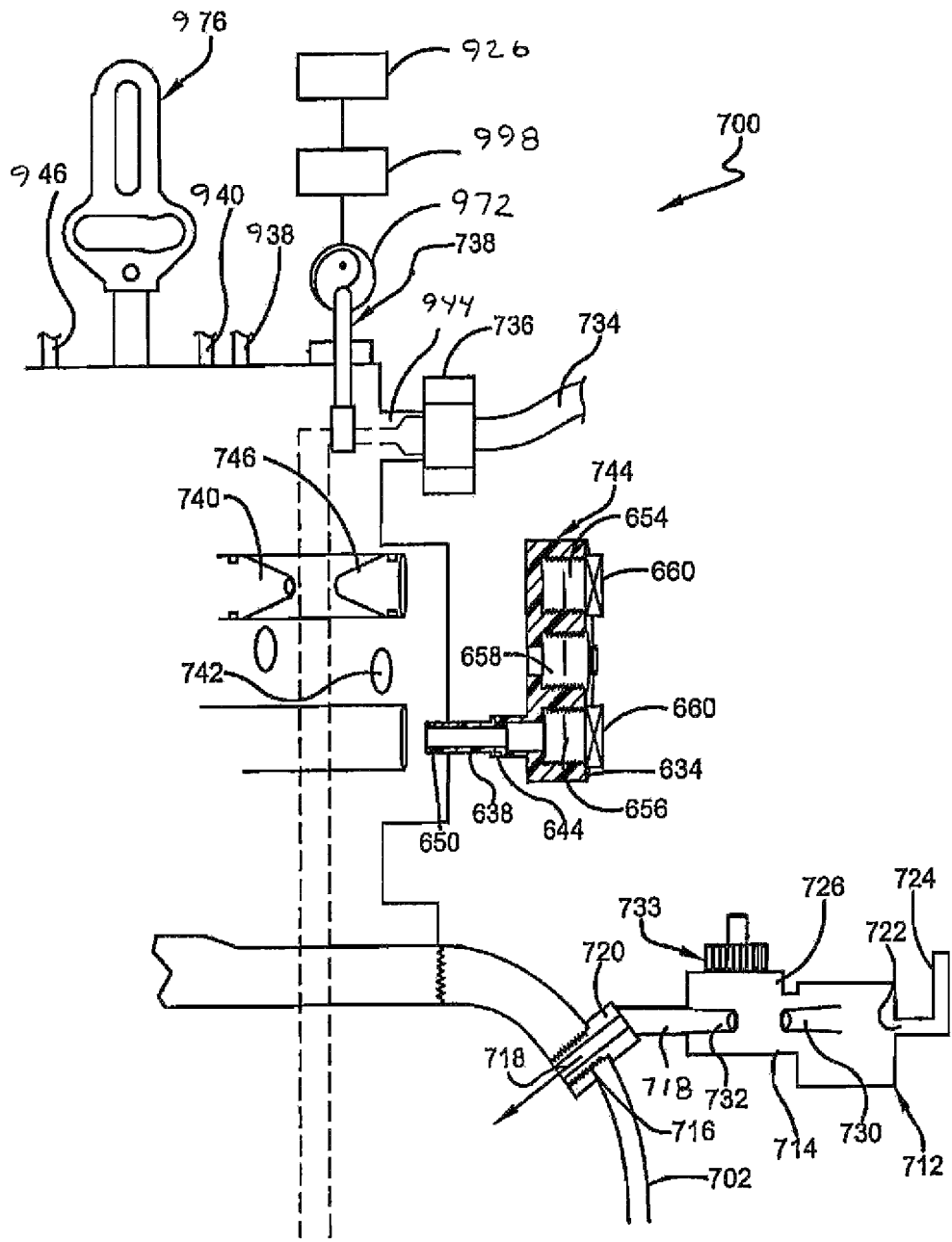
FIG. 14 is a schematic view showing certain features of the system in FIG. 13.

FIGS. 13-14 from the incorporated disclosures show an exemplary embodiment of a liquid treatment system 700 that uses oxidation and filtration in which contaminants are first oxidized so that they can be removed by filtration. The exemplary system is used for treating water. As shown in FIG. 13, the exemplary treatment system 700 includes a generally enclosed tank 702. The interior of the tank 702 includes a flow distributor plate 704 that supports liquid treatment material comprising filtration media 706 supported upon the distributor plate 704. The filtration media 706 may include any suitable media that can filter and remove contaminants such as iron, magnesium, or sulfur. Sorbing structures which are bodies in the shape of balls 708 are provided in the tank on top of the filtration media 706. These mass transfer balls 708 provide aeration and attract iron and other contaminants in the water and enhance removal of the iron and contaminants from the untreated water. The oxidation zone in the tank 702 includes a pocket or head of air 709 located in an upper area of the tank above the balls 708. A control valve 710 is mounted to the top of the tank 702. The control valve may be similar to control valve 10 and the control valves described in the incorporated disclosures.

A venturi type air injector nozzle assembly 712 is provided to introduce air into the tank 702. As depicted in FIG. 14, the air injector assembly 712 includes an external body 714 and a threaded fitting 716. The threaded fitting 716 is threadily fastened into a threaded opening 718 near the top of the tank 702. An elastomeric seal 720 is fastened on the exterior surface of the tank 702 and seals any openings between the air injector assembly 712 and the tank 702. The body 714 is located outside of the tank 702 and is in fluid communication with the interior of the tank 702. The body 714 includes a nozzle port 722 for receiving a drive water line 724. The body 714 further includes an air port 726 through which air can enter into the body 714 and the tank 702. The body 714 includes an outlet port 728 that is fluidly connected to the fitting 716. A venturi nozzle 730 is provided in the nozzle port 722 and a throat portion 732 is provided in the outlet port 728. A check valve 733 is provided in the air port 726. The flow of water through the nozzle causes air to be drawn into the water through the air port from a source of air such as ambient air. In other arrangements the air source may include a source of compressed air or other oxygen containing gas.

A liquid chlorine line 734 for supplying liquid chlorine from a source is fluidly connected to an injector 736. Alternatively, the line 734 may supply other types of suitable sterilizing disinfectant liquids. These may include for example hydrogen peroxide, Oxyclean™ liquid, or other disinfectant sterilizing liquid. The injector 736 is located at the external port 944 of a sterilizer valve 738. The sterilizer valve 738 is provided in a bore of the valve body 956 that fluidly communicates with the external port 944 connected to the liquid chlorine line. The sterilizer valve 738 may be of similar construction and design as the brine valve 64 of the previous or incorporated embodiments except that in this exemplary embodiment it is being used to control the flow of liquid chlorine from the liquid chlorine line 734 into the tank 702. This liquid chlorine is used to sterilize and disinfect the filtration media 706 and other substances in the interior of the tank 702.

The sterilizer valve 738 is operated to move between an open position to allow liquid chlorine from the line 734 to flow into the tank 702 and a closed position to block liquid chlorine flow from the line 734 into the tank 702. In particular, initially the sterilizer valve 738 is in the closed position as shown in FIG. 14. When a determination is made by the valve controller 926 to flow the liquid chlorine into the tank 702, the controller 926 is programmed to send a control signal to the motor 998 of the sterilizer valve 738 to cause the cam 972 to rotate clockwise until the cam projection engages and moves the valve stem downward as shown to open the sterilizer valve 738 for a programmed predetermined time. The controller 926 may include a timer to start timing when the control signal is sent. A venturi type nozzle injector 740 may be used to provide the motive force to draw the liquid chlorine into the tank 702. The venturi injector 740 is provided in the control valve 710 and is driven by the flow of untreated water. The flow of water through the nozzle causes the liquid disinfectant to be drawn into the flowing water. Such a venturi injector would be like that shown in the incorporated disclosures. With the sterilizer valve 738 opened, the liquid chlorine can flow from the liquid chlorine line 734 through the port 944 through the venturi injector 740 and down into the tank 702 for the predetermined time. After the controller 926 determines that the liquid chlorine has flowed for the predetermined time, the controller 926 then sends a control signal to the motor 998 for the sterilizer valve 738 to cause the cam 972 to rotate clockwise until the cam projection is disengaged from the valve stem to place the sterilizer valve 738 in the closed position.

An outlet 742 of the control valve is in fluid communication with the inlet port to an untreated water line 938 and is also in fluid communication with a threaded opening 658 of a body cover 744. The body cover is similar to that of the incorporated disclosures. In this embodiment, plugs 660 are threadily inserted into the first and second threaded openings 654, 656 to plug them up. Drive water flows out of the outlet 742 and then out of the third threaded opening 658 and into the drive water line 724. The drive water flows through nozzle 730 of an air injector assembly 712. The liquid flow through the nozzle draws air through the air port 726 and throat 732 and both flow into the tank 702.

In operation, a cycle begins with the control valve 710 in the service position in which the untreated water port is in fluid communication with a top opening of the tank 702, and a distribution tube 955 of the tank 702 is in fluid communication with the treated water outlet port of the control valve. The sterilizer valve 738 is in the closed position blocking the liquid chlorine from entering the tank 702. In this closed position, the upper end of the valve stem is located adjacent the trailing end (in the counterclockwise direction) of the cam projection and is therefore not engaged by the cam projection. In this position, the push button is not in the recess and depressed by the body of the cam so that a switch causes a signal to be sent to the controller 926 indicating that the sterilizer valve 738 is in the closed position. In the service position, the movable piston of the control valve is in a position to allow treated water to exit the treated water outlet port. Thus, untreated water flows from the untreated water inlet port of the control valve and into the tank 702. The untreated water passes through the pocket of air 709 in the upper portion of the tank and is oxidized as it travels through the head of air. The untreated water also travels through the aeration and sorbing balls 708, which enhance removal of the iron and other contaminants from the untreated water. The oxidized matter is subsequently filtered out of the filtration media 706. The water then passes through the filtration media 706 and flows up through the distribution tube 955 to the tank port of the valve body 956 and to the treated water line outlet port and a treated water line 940.

When a determination is made by the controller 926 to operate an air induction cycle due to, for example, most of the air being used for oxidation, first the piston in the control valve is moved by the motor connected to actuator bracket 976 to a position so that the top opening of the tank 702 is in fluid communication with the drain port of the control valve and drain line 946. In this position, any residual air is removed from tank 702. The motor operates to move bracket 976 in a creeper mode to cause the piston in the valve to move very slowly to open the drain port so that the air is released very slowly. After the air is removed, the piston is longitudinally positioned to decompress the tank 702 to draw air. The piston is also positioned so that untreated water can flow to the venturi injector 740. The sterilizer valve 738 is placed in the open position. The piston is also moved to a position in which the untreated water can flow through nozzle 746 of the venturi injector 740 to draw the liquid chlorine from the line 734 and through the venturi injector 740 and into the tank 702 to sterilize the elements in the interior of the tank 702. The sterilizer valve 738 is then moved to a closed position after a predetermined time.

The piston of the control valve then moves into a down-flow rinse position for a time period and then to a position where there is no flow into the tank for a predetermined time. This allows more contact time with the liquid chlorine for enhanced oxidation. Then, a backwash cycle is performed. The motor and actuator bracket 976 for the piston causes the piston to move to the backwash position similar to that shown in FIG. 3. Also, the motor 998 for the sterilizer valve 738 causes the cam 972 to rotate clockwise until the cam projection is disengaged from the valve stem to place the sterilizer valve in the closed position to prevent sterilizer fluid from flowing into the tank 702. In this position, the top opening of the tank 702 is in fluid communication with the drain port of the valve, and the untreated water inlet port is in fluid communication with both the treated water outlet and the distribution tube 955. Thus, untreated water entering from the inlet orifice port flows both through the outlet orifice port to supply untreated water to the treated water line 940, and also through the distribution tube 955. The untreated water flows down through the distribution tube 955 and up through the filtration media 706 and out the drain port of the valve to backflush trapped particulate matter from the filtration media 706. It also flushes the air 709 out of the tank 702 through the drain port and drain line 946. In this position, a switch in operative connection with the cam 972 causes a signal to be sent to the controller 926 indicating that the sterilizer valve 738 is in the closed position.

After the backwash phase of the cycle is complete, the motor of the control valve causes the piston to move to the rapid rinse position (such as in FIG. 5). In this position, the untreated water inlet port is connected to the treated water outlet port and the top opening of the tank 702. The distribution tube 955 is connected to the drain port, thereby rinsing the tank 702 with untreated water.

Then, an air induction cycle is performed. The motor of the valve causes the piston to move so that the tank 702 is decompressed and the drain port of the valve and drain line 946 is opened. The piston is positioned such that untreated water from the untreated water inlet port flows through the outlet 742 and opening 658 and into the drive water line 724. The check valve 733 is open to allow air to enter the air injector assembly 712. The drive water flows through the nozzle 730 to draw air through the air port 726. The air and drive water combine to travel through the throat 732 and through the fitting 716 and opening 718 and into the tank 702. The untreated water also flows into the top opening of the tank 702 from the control valve 710. The water flows from the bottom of tank 702 up through the distribution tube 955 and out the drain port of the control valve. As water flows out of the drain port, the tank 702 is being filled with air from the air injector assembly 712. This is continued until the water is substantially drained from the interior of the tank 702 and the volume of the tank not occupied by the filtration media 706 is filled with air. After this occurs, the check valve 733 automatically closes to prevent air from escaping from the tank 702. Then, the control valve 710 causes the piston therein to be positioned in the service position for normal filtration operation. Since the air is injected directly into the tank 702 and bypasses the control valve 710, fouling due to oxidation is reduced in the control valve.

When air is injected into the tank 702 to oxidize the iron/sulfur contaminants before the untreated water flows through the filter media 706, the contaminants are oxidized resulting in ferrous oxide or iron oxide being produced in the upper area of the tank 702 above the filter media 706. Since the control valve 710 is mounted on the top of the tank 702 and extends into the upper area of the tank, the piston and seals associated with the piston of the control valve 710 are exposed to the head of compressed air 709. These resilient seals are durable when wet, since they are designed to be exposed to water such as in the water softener systems described in the incorporated disclosures. However, when the seals are exposed to the compressed air and iron during the filter service condition of the water treatment system 700, the oxidation can cause the seals to dry out and harden causing premature wear and failure. Further, the iron particles from the iron oxide adhere to the seals and the piston forming sludge and/or crust. Such conditions can cause the seals to be fused to the piston, resulting in the piston sticking to the seals, which inhibits the piston's normal sliding movement in connection with the seals. This condition also creates more load on the motor and drive gears to move the piston relative to the seals. The sticking and unsticking of the piston to the seals may also tear and/or remove pieces of the seals and inhibit their sealing performance. Thus, these seals may need to be changed often if the control valve 710 is mounted to the top of the tank 702 in a water treatment system 700 that uses oxidation and filtration to treat the water if the valve interior area is generally exposed to air.

In addition, the compressed head of air 709 in the air pocket in the upper area of the tank may cause air to back flow into the untreated water line 938 that supplies untreated water from the water source such as a well. This backflow of air can cause "coughing" or "spitting" in the water lines. A check valve may be provided in the untreated water line 938 that supplies untreated water to the upper chamber of the tank 702 to prevent the back flow of air. However, the check valve will also be exposed to the compressed air and iron such that the iron particles adhere to the check valve and cause the check valve to develop sludge and/or crust up. This condition restricts the flow of water coming into the upper chamber of the tank 702 and also causes the check valve to fail to prevent the air from back flowing into the water lines.

Figure 15:
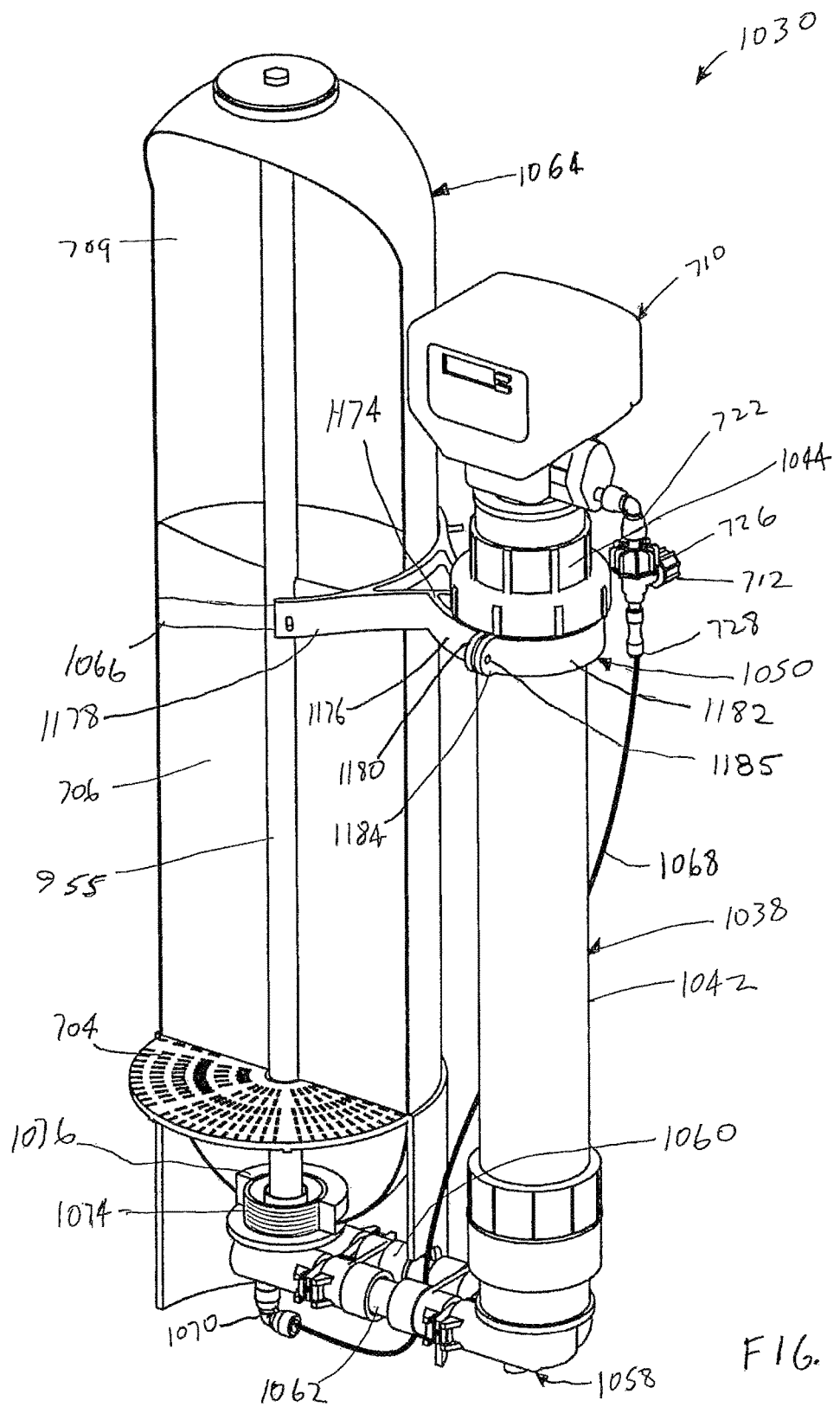
FIG. 15 is a partial cutaway front perspective view of a further exemplary liquid treatment system.

FIG. 15 shows an exemplary embodiment of a liquid treatment system 1030 that reduces these problems of premature failure of the seals in a control valve and seals being fused to the piston within the control valve as well as failure of check valves. The water treatment system 1030 is similar to the water treatment system 700 except as discussed below. Thus, in this exemplary embodiment, the same reference numbers are generally used for elements that are similar in construction and function as that of the water treatment system 700 of the previous embodiment. As seen in FIG. 15, the water treatment system 1030 includes the control valve 710. The control valve is located away from the top of the tank 1064 and in a manner so that the plurality of seals associated with the piston generally remain wetted and in water and are not exposed for extended periods to the compressed air and iron. Exposure to air does not occur during the exemplary filtering operation when the control valve is in the filter service condition. The tank 1064 is similar to the tank 702 of the previous embodiment except for that described below.

Figure 16:
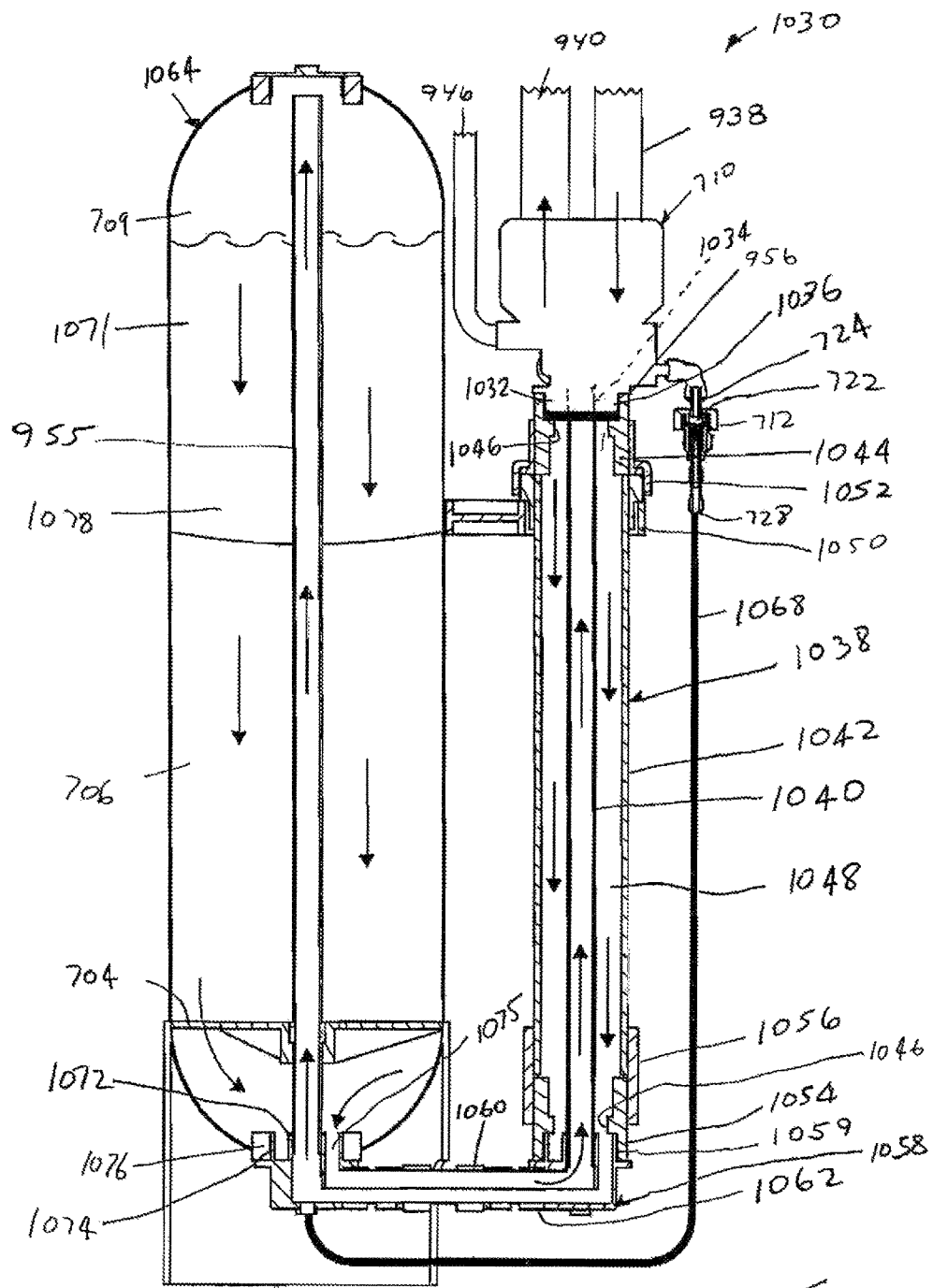
FIGS. 16-19 are front sectional views of the system of FIG. 15 shown in various stages of operation.

The control valve 710 includes an untreated water inlet port, the treated water outlet, and drain port similar to valve 10 and the valves of the incorporated disclosures. The drain port is operatively connected to the drain line 946. The untreated water inlet port is operatively connected to the untreated water line 938. The treated water outlet is operatively connected to the treated water line 940. Referring to FIG. 16, the control valve 710 includes a valve body 956. The valve body 956 includes a plurality of passages and external ports in open communication with the exterior of the valve body. The valve body 956 includes internal passages that open into the central bore of the valve body 956. The central bore is in fluid communication with a lower port 1032, which is formed in one piece with the valve body 956. The lower port 1032 includes an inner tube 1034 that is surrounded by a concentric outer tube 1036. The outer tube 1036 has a threaded external surface.

The water treatment system 1030 further comprises a riser assembly 1038. The riser assembly 1038 includes a central inner pipe 1040 that is surrounded by a concentric outer pipe 1042. The diameter of the inner tube 1034 and inner pipe 1040 are smaller than the diameter of their respective outer tube 1036 and outer pipe 1042. A threaded upper female coupling 1044 is rigidly secured to the upper end of the riser assembly 1038. The upper female coupling 1044 includes an integral step 1046 that extends inwardly from the inner surface of the upper female coupling 1044 and circumferentially around the interior of the upper female coupling 1044. The valve body 956 is mounted on and fluidly connected to the riser assembly 1038. In particular, the outer tube 1036 of the lower port 1032 threadily engages the upper female coupling 1044 such that the lower end of the outer tube 1036 securely seats on the step 1046. In this position, the inner tube 1034 is in fluid communication with the inner pipe 1040 and the outer tube 1036 is in fluid communication with the outer pipe 1042. A seal is operatively connected to the inner pipe 1040 and the inner tube 1034 to seal them from the outer tube 1036 and outer pipe 1042, thereby preventing fluid flowing through the inner tube 1034 and inner pipe 1040 from escaping into the outer passageway 1048 defined by the inner pipe 1040 and inner tube 1034 and outer pipe and outer tube. A seal is operatively connected to the outer pipe 1042 and the outer tube 1036 to seal them together, thereby preventing fluid flowing through the outer passageway 1048 from escaping.

A lower threaded female coupling 1054 is rigidly secured to the lower end of the riser assembly 1038 by a connector fitting 1056. The lower female coupling 1054 includes an integral step 1046 that extends inwardly from the inner surface of the lower female coupling 1054 and circumferentially around the interior of the lower female coupling 1054. A u-shaped pipe assembly 1058 is fluidly connected to the lower female coupling 1054. The pipe assembly 1058 has a first end 1059 that is threadably secured to the lower female coupling 1054 and abuts against the underside of the step 1046. The pipe assembly 1058 includes first and second conduits 1060, 1062. The inner pipe 1040 extends into the first conduit 1060 and is in fluid communication with the first conduit 1060. A seal may be provided to seal the first conduit 1060 and inner pipe 1040 to each other. The second conduit 1062 is in fluid communication with the outer passageway 1048. The second conduit 1062 is in fluid communication through a tube fluid port with the distribution tube 955 of the tank 1064. The distribution tube extends downward into an end 1072 of the second conduit 1062. The tube terminates in the upper area of the tank with a tube opening configured to be within an air pocket at the upper end of the tank when the air pocket is present. The first conduit 1060 is in fluid communication with the bottom of the tank 1064. The piping assembly 1058 may include threaded pipe section 1074 that surrounds and is concentric with the tank end 1072 of the second conduit 1062. The threaded pipe section 1074 and the end 1072 are radially spaced from each other to define an outer passageway 1075 which serves as a lower tank fluid port. The threaded pipe section 1074 threadily engages a connector 1076 to support and seal the pipe section 1074 to the tank 1064.

The external ports of the control valve 710 are fluidly connected to the untreated water line 938, treated water line 940, drain line 946, air injector assembly 712, and the inner and outer pipes 1040, 1042 of the riser assembly 1038. The drain port provided at the valve body 956 is in fluid communication with the central bore and drain line 946. Similar to the previously described control valve and the valves of the incorporated disclosures, the control valve has a central bore configured to slidingly receive a piston and a seal assembly. The piston is connected to a piston rod and rod retainer. A retaining plate may be integrally formed in one piece with the piston rod. The seal assembly includes a plurality of seals that are fixed to the valve body 956 at locations that, upon their engagement with the piston, seal the internal valve passages from other valve passages. The piston axially moves through the annular resilient seals when the piston is moved up or down to selected certain positions to place the various fluid passages and ports of the valve in fluid connection.

As previously mentioned, the interior of the exemplary tank 1064 includes a distributor plate 704 that supports filtration media 706 placed upon the distributor plate 704. The distributor plate serves as a water diffuser for distribution of water flow when the tank and filter media are backflushed. The filtration media 706 may include any suitable media that can filter and remove contaminants such as iron, magnesium, or sulfur. Aeration or sorbing structures such as balls 708 such as shown in FIG. 13 may be provided in the tank on top of the filtration media 706. Theses mass transfer balls 708 attract iron and other contaminants in the water and enhance removal of the iron and contaminants from the untreated water. As depicted in FIGS. 16-19, water 1071 is positioned between the filtration media and the pocket of compressed air. The oxidation zone in the tank 702 includes the pocket of compressed air 709 located above the water and balls 708. The water 1071 prevents the compressed air from reaching the bottom of the tank 1064 and hence the second conduit 1062 of the pipe assembly 1058. The distribution tube 955 extends from the bottom of the tank 1064 to near the top of the tank 1064.

The exemplary riser assembly 1038 is operatively attached to the tank 1064 by a clamp 1050. The clamp may be a double C clamp as seen in FIG. 15. Specifically, the clamp 1050 includes a one piece base 1174 that has first and second c-shaped end portions 1176, 1178 that are oriented horizontally and face away from each other. The first c-shaped portion 1176 includes flanges 1180 integrally formed at the free ends of the first c-shaped end portion 1176. The first c-shaped portion 1176 surrounds and receives a portion of the riser assembly 1038. The clamp 1050 includes a c-shaped member 1182 with flanges 1184 integrally formed at the free ends of the c-shaped member 1182. The flanges 1184 may be connected with a faster 1185. The c-shaped member 1182 surrounds and receives the remaining portion of the riser assembly 1038. The c-shaped member 1182 is fastened to the first c-shaped portion 1176 to support the riser assembly 1038, control valve 710, female coupling 1054, pipe assembly 1058, and other related elements to the tank 1064. This is accomplished by aligning and abutting associated pairs of flanges against each other and fastening a screw, bolt or other fastening to them. An upper connector fitting 1052 is connected to the clamp 1050, riser assembly 1038, and upper female coupling 1044 to help further secure the upper female coupling 1044 to the riser assembly 1038.

The second c-portion 1178 of the clamp surrounds and receives a portion of the tank 1064. A rubber strap or seal 1066 (FIG. 15) may be attached to the opposite ends of the second c-portion 1178 of the clamp 1050 and fit around the remaining portion of the tank 1064 to secure the tank 1064 to the clamp 1050. The strap 1066 is strong and flexible and will expand or contract in response to the tank 1064 expanding or contracting. Thus, unlike a metallic band, the rubber strap 1066 is soft and flexible so as to not cause damage to the fibers of the tank 1064. The clamp 1050 may be formed of metal such as steel, plastic, or any other suitable material.

The venturi nozzle type air injector assembly 712 is provided to inject air into the tank 1064. As depicted in FIG. 14, the air injector assembly 712 includes the external body 714 and an outlet port 728. In this embodiment, the outlet port 728 is fluidly connected to a hose 1068, which is in turn fluidly connected to an elbow fitting 1070 as depicted in FIG. 15. The elbow fitting 1070 is fluidly connected to the end of the pipe assembly 1058 connected to the bottom of the tank 1064. The elbow fitting 1070 is in fluid communication with the second conduit 1062 and the interior area of the distribution tube 955. The body 714 is located outside of the tank 702 and is in fluid communication with the interior area 1078 of the tank 702. The body 714 includes the nozzle including the nozzle port 722 for receiving the drive water line 724. The nozzle port 722 is connected to an untreated water port of the control valve. The body 714 further includes an air port 726 through which air can enter into the body 714 and eventually the tube and the tank 702. The body 714 includes an outlet port 728 that is fluidly connected to the fitting 716. With reference to FIG. 14, a venturi nozzle 730 is provided in the nozzle port 722 and a throat portion 732 is provided in the outlet port 728. A check valve 733 is provided in the air port 726.

Similar to the previously described embodiment, the liquid chlorine line 734 for supplying disinfectant fluid such as chlorine from a source is fluidly connected to the injector 736 as shown in FIG. 14. Alternatively, the line 734 may supply other types of suitable sterilizing liquids. The injector 736 is located at the external port 144 of a sterilizer valve 738. The sterilizer valve 738 may be provided in a bore of the valve body 956 that fluidly communicates with the external port 944 connected to the liquid chlorine line. The sterilizer valve 738 is operated to move between an open position to allow liquid chlorine from the line 734 to flow into the tube and into the interior area of the tank 702 and a closed position to block liquid chlorine from the line 734 to flow into the tank 702.

As seen in FIGS. 15-19, the exemplary control valve 710 is positioned away from the top of the interior area 1078 of the tank 1064 which houses the compressed air during filtering operation when the control valve is in the filter service condition. The entire piston of the control valve is positioned so it is generally maintained wetted and exposed only to liquid during operation, and is exposed to air only during the relatively short periods during an operating cycle in which air at the top of the tank is passed through the valve to exhaust the air from the tank. By maintaining the valve piston and the plurality of seals in a wetted condition at almost all times, oxidation of iron and other materials in the water is reduced within the valve. This reduces the formation of damaging sludge and crust which can cause valve failures.

In operation, an exemplary cycle begins with the control valve 710 in the service position as shown in FIG. 16 in which untreated water is filtered. In this condition, the untreated water inlet port is in fluid communication with the outer passageway 1048 between the inner and outer tubes 1034, 1036, the outer passageway 1048 in the riser assembly 1038 between the inner and outer pipes 1040, 1042, the first conduit 1060, and the distribution tube 955. The bottom of the tank 702 is in fluid communication with the first conduit 1060, inner pipe 1040, inner tube 1034, and treated water outlet port of the control valve. The sterilizer valve 738 is in the closed position blocking the liquid chlorine from entering the tank 702. In this closed position, the upper end of the valve stem is located adjacent the trailing end (in the counterclockwise direction) of the cam projection and is therefore not engaged by the cam projection of the cam 972. In this position, a switch causes a signal to be sent to the controller 926 indicating that the sterilizer valve 738 is in the closed position. In the service position of the control valve, the piston is in a position to allow treated water to exit the outlet port. Thus, untreated water flows from the untreated water port of the control valve, through the outer passageway 1048, through the second conduit 1062, and up through the tube opening of distribution tube 955. The untreated water passes outside the tube through the pocket of compressed air 709 at the top of the tank and contaminants in the water are oxidized as the water travels through the pocket of compressed air. The untreated water also travels downwardly through the sorbing balls 708, which enhance removal of the iron and other contaminants from the water. The oxidized matter is subsequently filtered out by the filtration media 706. The water then passes through the filtration media 706 and flows out through the lower tank fluid port at the bottom of the tank 1064. The filtered water then flows through the first conduit 1060, the inner pipe 1040, the inner tube 1034, and then through the outlet port of the valve body 956 to the treated water line 940.

After filtration is ongoing for some time the oxygen in the compressed air is consumed through the chemical oxidation process. The determination to replenish the compressed air may be done through programmed operation of a controller such as controller 926. Such a determination may be made based on a programmed basis in response to certain factors or combinations of factors. For example, in some arrangements the controller may operate to make the determination on a timed basis based on elapsed time since the last time the air was replenished. In other arrangements, a flow meter may be used to measure the volume of treated water that has passed through the tank since the air was replenished, and replenish the air and filtration capabilities after a certain number of gallons.

In other arrangements sensors may be included in the air to measure the oxygen content. The sensing that the oxygen content has declined to a given level may be used as a threshold for the controller to operate to make a determination to cycle the system. In other arrangements the volume and/or pressure change in the air in the pocket at the top of the tank may be measured to detect reductions as oxygen in the air is consumed through oxidation. In still other arrangements sensors may be used to sense the level of oxidizable material in the water to determine a need to replenish the air. For example, sensing an increase in such material in the treated water leaving the tank will reflect a reduction in filter efficiency and a need to replenish the air. Alternatively or in addition, sensing the level of oxidizable contaminants in the incoming untreated water may be used to determine how long the system should be operated before the air should be replenished. Some controller embodiments may operate based on one or more such factors and other factors in making programmed determinations of a need to replenish the air at the top of the tank. Further in some exemplary embodiments controllers may consider factors such as water temperature, viscosity, hardness, surface tension and resistance to atomization in determining the concentration of oxygen needed to effectively treat the water. Of course these approaches are exemplary.

Figure 17:
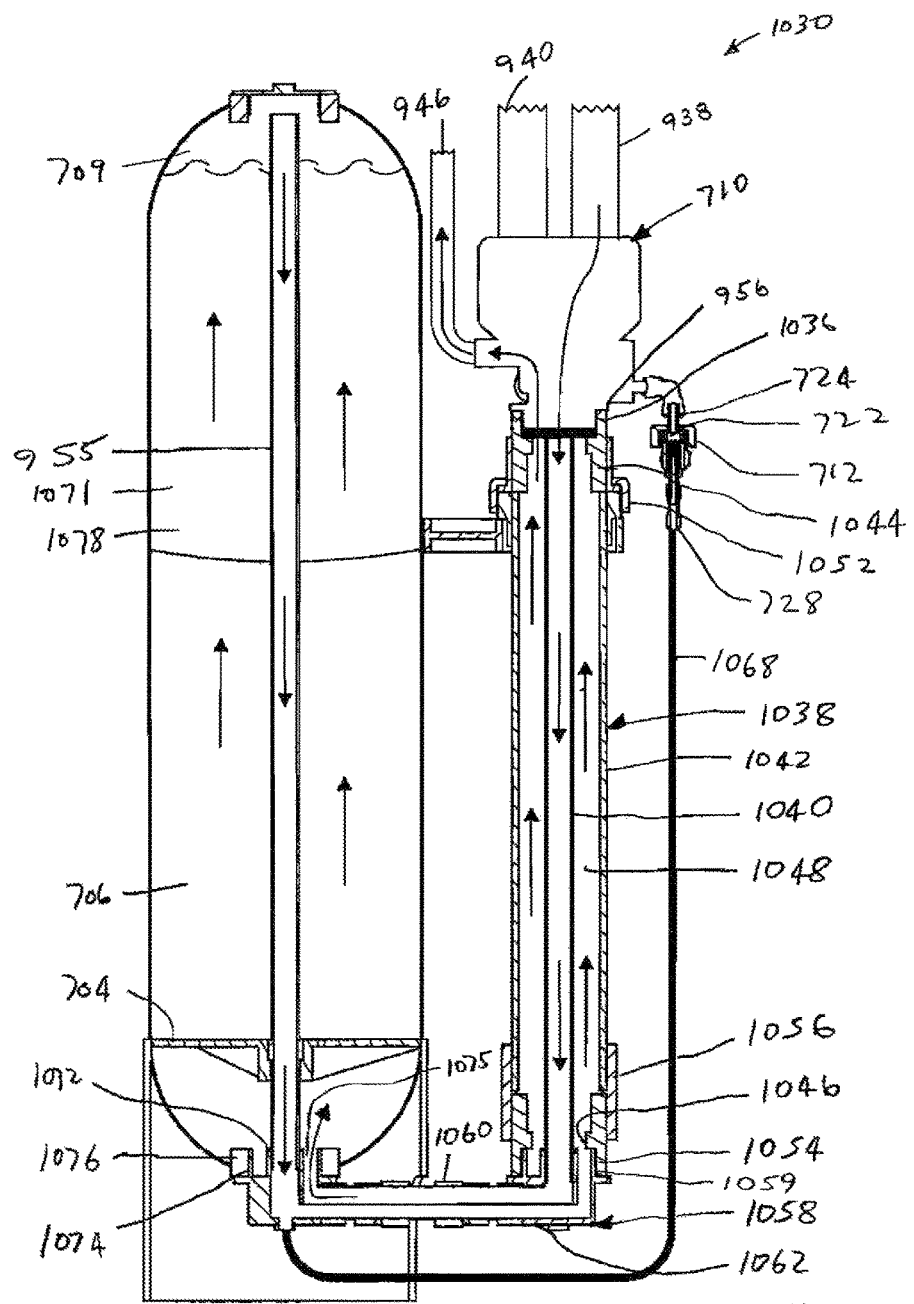

Upon a determination being made by the controller 926 to operate an air induction cycle, first the piston of the valve is axially moved by the motor to a position as represented in FIG. 17 so that the inner pipe and distribution tube are in fluid communication with the drain port of the control valve. In this air release condition, any residual air is removed from the tank 1064. In the exemplary arrangement, the motor operates in a creeper mode to cause the piston to move very slowly to slowly open the drain port so that the air is released in a controlled manner. It is during this portion of the cycle that the internal valve components are exposed to air, and in this case the oxygen which could cause the formation of sludge and crust is largely depleted from the air that passes through the valve.

After the air is removed from the top of the tank, the piston of the control valve is moved to decompress the tank 1064 to draw air. The piston is also axially moved so that untreated water from the water line 938 flows through the untreated water port through the nozzle port 722. In this air introduction condition the drive water flows through the nozzle 730 to draw air through the air port 726 and throat 732 and they both flow through the tube 1068. Air is carried in the water upward through the distribution tube 955 and into the top of the tank 1064. The sterilizer valve 738 is also placed by the controller in an open position. The piston of the control valve is also axially moved to a position which corresponds to a disinfectant introduction condition where the untreated water can flow through nozzle 746 of the venturi injector 740 to draw from a source of liquid chlorine from the line 734 and through the venturi injector 740 from which the water and disinfectant move upwardly through the distribution tube 955 and into the tank 1064 to sterilize the elements in the interior area 1078 of the tank 1064. The sterilizer valve 738 is then moved to a closed position after a predetermined time or other programmed basis.

The piston of the control valve then moves into a down flow rinse configuration for a set time period and then to a position where there is no flow into the tank 1064 for a predetermined time. This allows more contact time with the liquid chlorine for enhanced sterilization. Then, a backwash cycle is performed. The motor is controlled to cause the piston of the control valve to move to the backwash position represented in FIG. 17. In the backwash condition untreated water passes upward through the lower tank fluid port and the distributor plate to backwash the filter media. Also, the motor 998 for the sterilizer valve 738 causes the cam 972 to rotate clockwise until the cam projection is disengaged from the valve stem to place the sterilizer valve 738 in the closed position to prevent fluid from flowing into the tank 1064. As represented in FIG. 17, in this position, the distribution tube 955 is in fluid communication with the drain port of the control valve. The untreated water inlet port is in fluid communication with the inner tube 1034, the inner pipe 1040, the first conduit 1060, and outer passageway 1075. Thus, untreated water entering from the inlet port of the control valve flows through the inner tube 1034, the inner pipe 1040, the first conduit 1060, and outer passageway 1075 into the bottom of the tank 1064. The untreated water flows up the bottom of the tank through the lower tank fluid port and the filtration media 706 and then to the upper area of the tank. The water in the backwash flow enters the tube opening at the top thereof and flows down through the distribution tube 955 and out the drain port of the control valve to flush trapped particulate matter from the filtration media 706. It also flushes the air 709 that was introduced at the time of introducing the liquid chlorine out of the tank 702 through the control valve drain port. In this position, a switch in operative connection with the cam 972 causes a signal to be sent to the controller 126 indicating that the sterilizer valve 738 is in the closed position.

Figure 18:
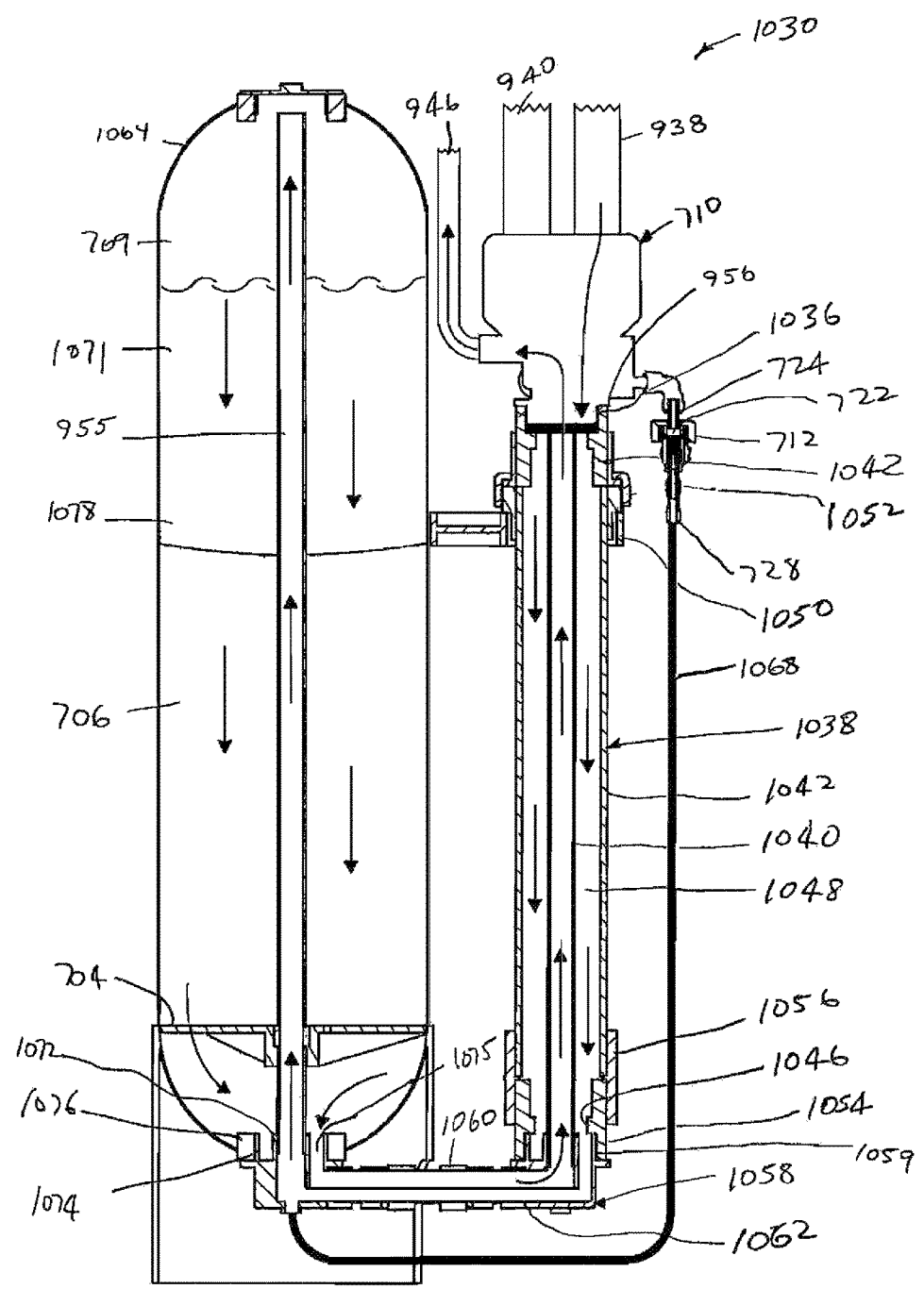

After the backwash phase of the cycle is complete, the motor is controlled to cause the piston of the control valve to move to the rapid rinse position (see FIG. 18). In this position, the untreated water inlet port of the valve is connected to the treated water outlet port. The untreated water inlet port is also in fluid communication with the outer passageway 1048, second conduit 1062, and the distribution tube 955 of the tank 1064. Untreated water flows up and out of the opening of the distribution tube 955 and down inside tank 1064 through the filtration media 706, the outer passageway 1075, the first conduit 1060, the drain port of the valve and to the drain line 946. This action rinses the tank 1064 and filtration media with untreated water.

Figure 19:
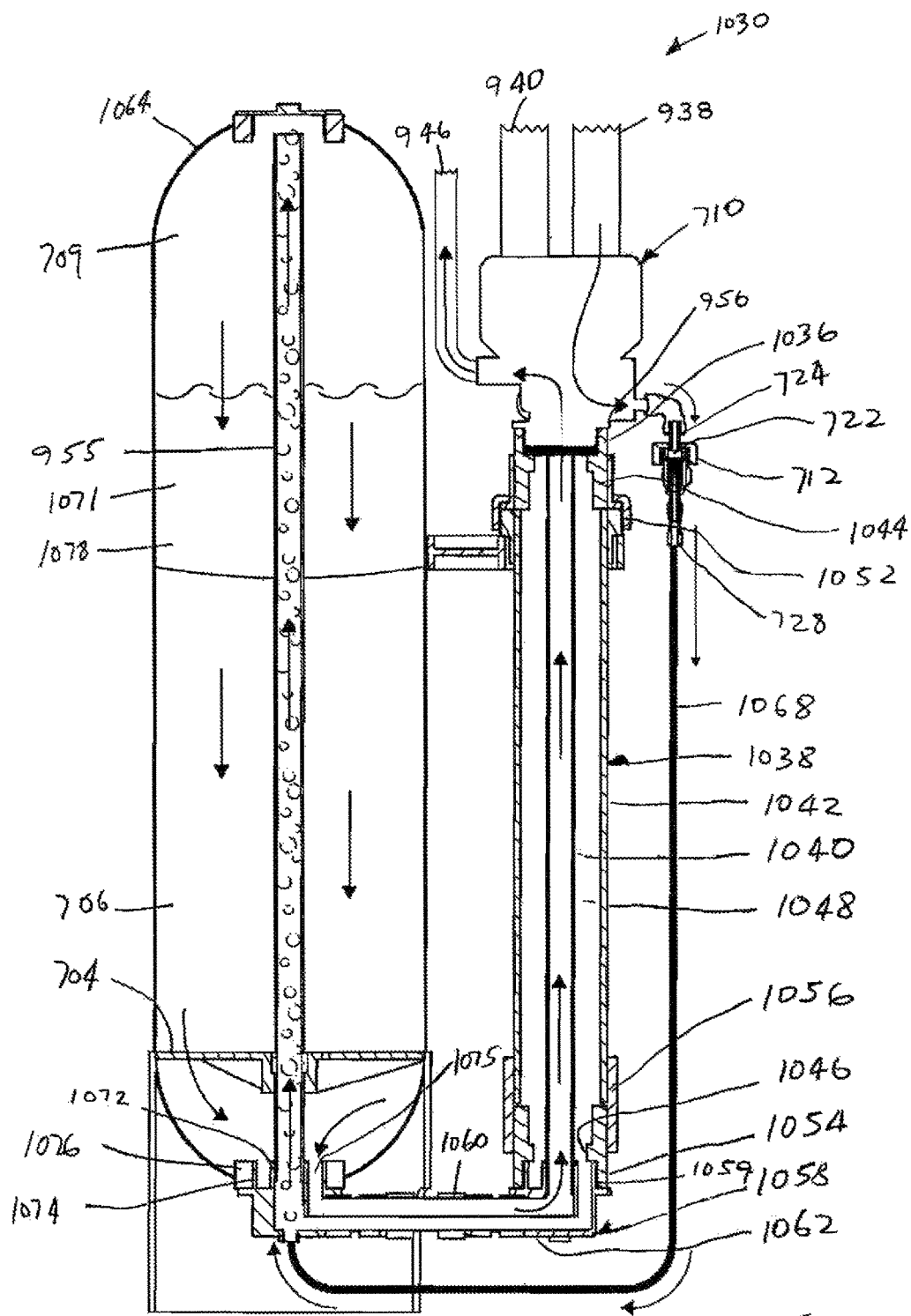

Then, air introduction to form the air pocket in the tank is performed as represented in FIG. 19. The motor is controlled to cause the piston of the control valve to move so that the tank 1064 is decompressed by having the valve drain port and drain line 946 opened. The piston is moved such that untreated water from the inlet port flows through the outlet 742 and drain port or opening 658 (FIG. 14) and into the drive water line 724. The check valve 733 is open to allow air to enter the air injector assembly 712. Referring to FIGS. 14 and 15, the drive water flows through the nozzle 730 to draw ambient air through the air port 726. The air and drive water combine to travel through the throat 732 and through the tube 1068 and the second conduit 1062 and up through the distribution tube 955 into the top of the tank 1064. The air pocket accumulates at the top of the tank. The water flows down through the filtration media 706 to the bottom of tank 1064 and passes through the first conduit 1060, the inner pipe 1040, the inner tube 1034 and out the drain port of the control valve. As water flows out of the drain port, the tank 1064 is being filled with air from the air injector assembly 712. This is continued until the water is substantially displaced from the interior area 1078 of the tank 1064 and the volume of tank 1064 not occupied by the filtration media 706 is filled with air. After this occurs, the check valve 733 automatically closes to prevent air from escaping from the tank 1064. Then, the control valve 710 is controlled responsive to the controller to move to the filter service position for normal filtration operation in which the interior area of the control valve remains continuously wetted. In some alternative embodiments, the order of the configurations in the cycle can be changed if desired. For example, the air induction configuration could occur before the rinse cycle.

Since the incoming air is injected directly into the tank 1064 and bypasses the control valve 710, fouling due to the contaminants in the water being exposed to oxygen is reduced in the interior area of control valve 710. Also, since the components within control valve 710 such as the piston, seals, and other parts are almost always covered by water, the control valve 710 is less susceptible to wear because the ions entrained in the water do not oxidize in the interior of the valve. In the exemplary arrangement, water comes through the control valve 710 but gets oxidized in the tank 1064 and immediately is filtered and then flows back through the control valve 710. The control valve 710 is exposed to unoxidized iron or other ions in the untreated water or clean water. The interior of the control valve 710 is not exposed to the oxygen in air except during relatively short periods in the operating cycle when air is exhausted from the tank, and such air generally has the oxygen therein somewhat depleted. As shown in the embodiment, the control valve 710 is located outside of the tank 1064 and adjacent to the side of the tank 1064. This reduces the oxidation of contaminants that can occur within the valve and avoids damage to internal valve components.

Figure 20:
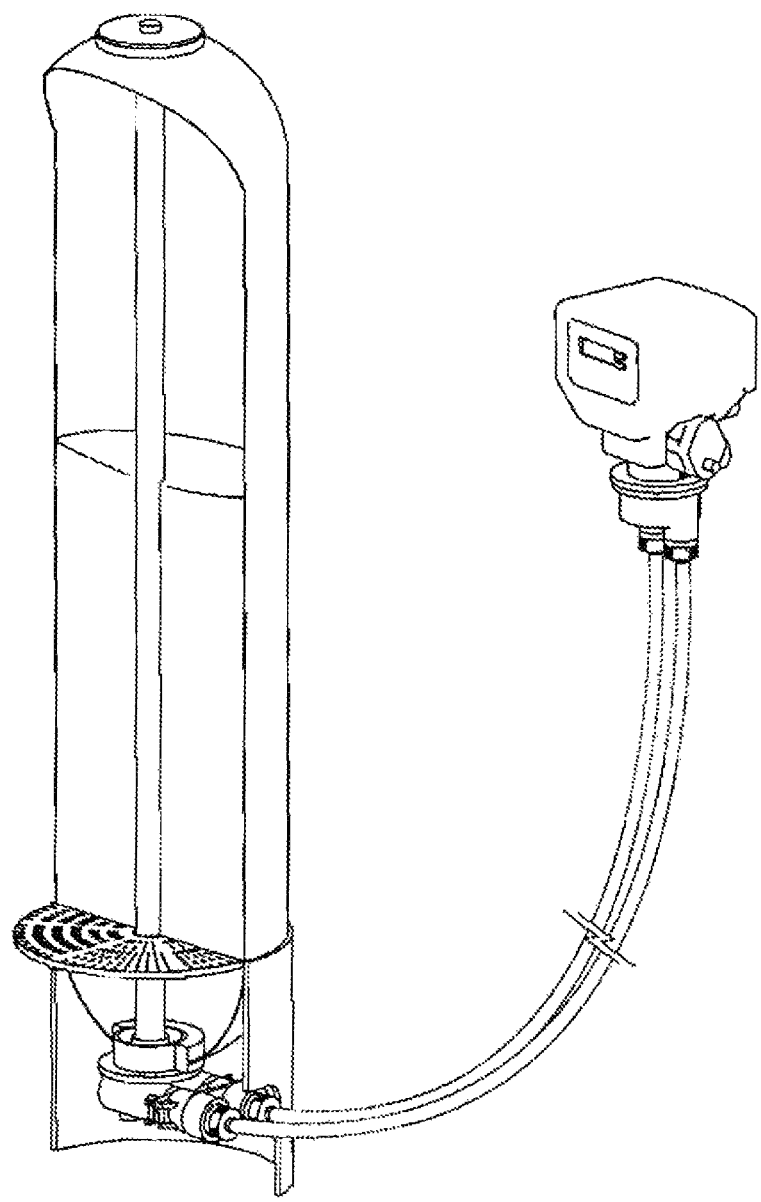
FIGS. 20-21 are alternative arrangements for positioning a control valve in a liquid treatment system.
Figure 21:
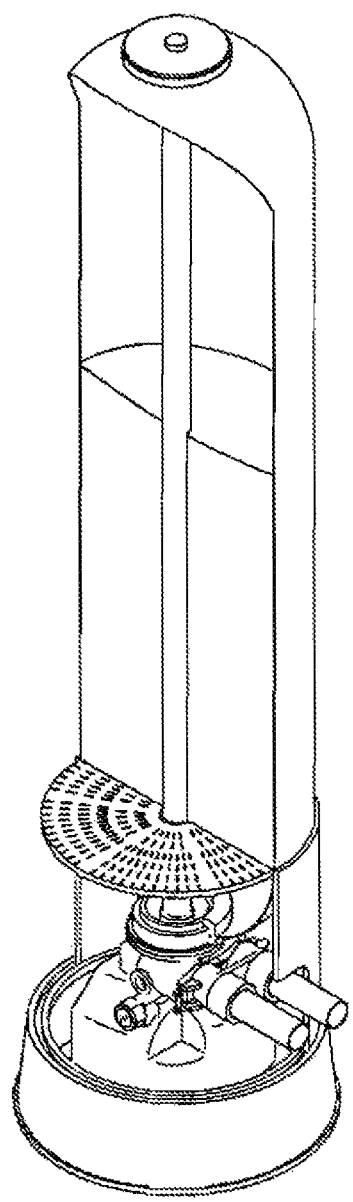
Figure 22:
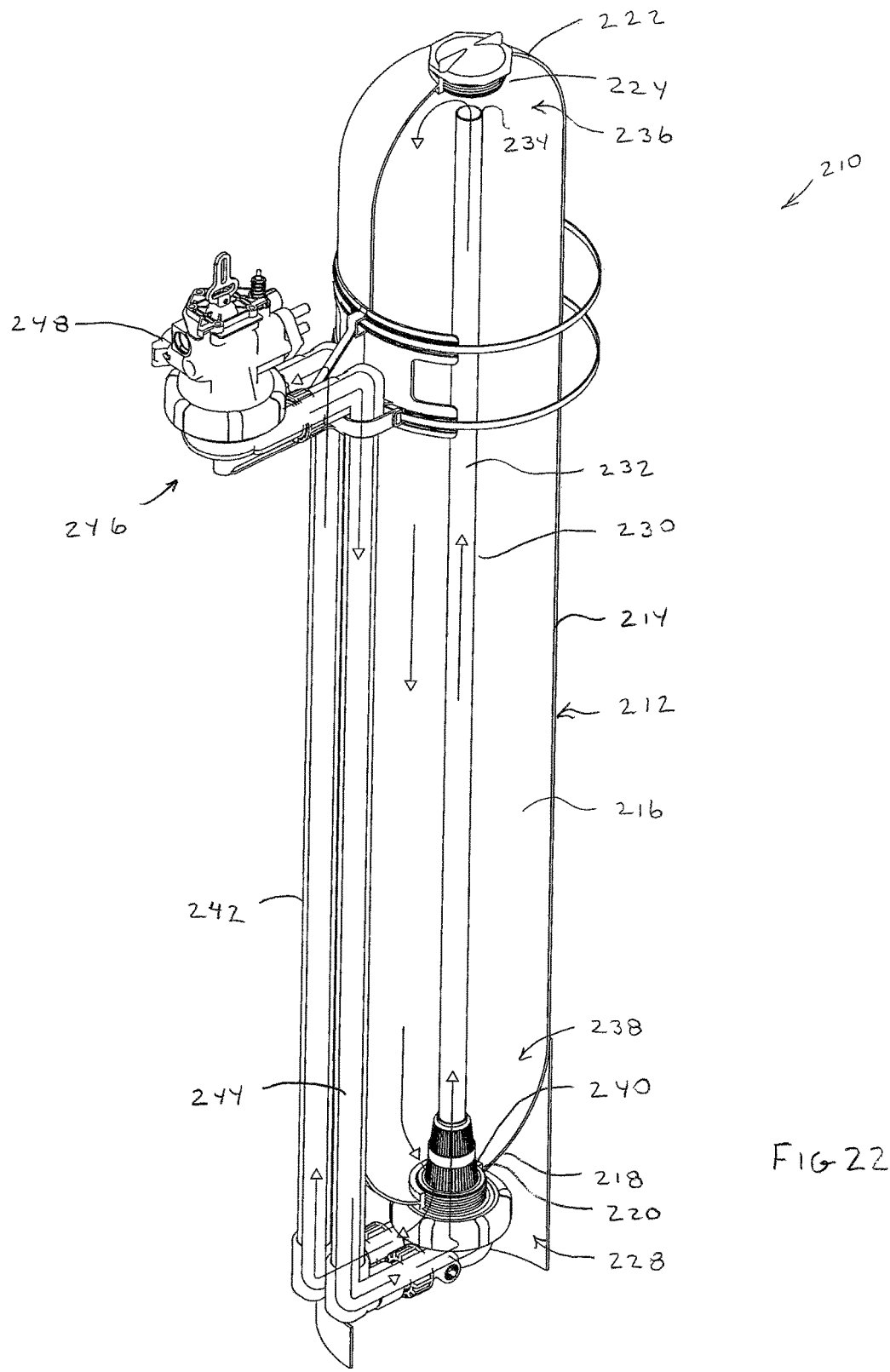
FIGS. 22-28 show an alternative arrangement for a liquid treatment system, including a liquid connector suitable for connecting a control valve and a liquid treatment tank.

It should be noted that the control valve 710 may be located elsewhere relative to the air pocket at the top of the tank 1064 to limit exposure of internal components of the control valve 710 to oxygen. For example, FIG. 20 shows a control valve located away from the tank and connected thereto via flexible conduits. Flexible conduits can be used in lieu of the stand pipe arrangement of the exemplary embodiment previously described. FIG. 21 shows an alternative configuration where the control valve is located beneath the tank in a base structure. Locating the control valve within the base structure may be used to provide a more compact arrangement with the tank. Of course it should be understood that the arrangements shown are exemplary and in other embodiments other arrangements and configurations may be used.

FIGS. 22 through 28 show an alternative embodiment of a liquid treatment system 210. System 210 is generally similar to liquid treatment system 1030 shown in FIGS. 15-20 and the alternative system shown in FIG. 21. System 210 includes a liquid connector structure that enables interchangeably providing liquid connections to a liquid treatment tank and a control valve.

Figure 28:
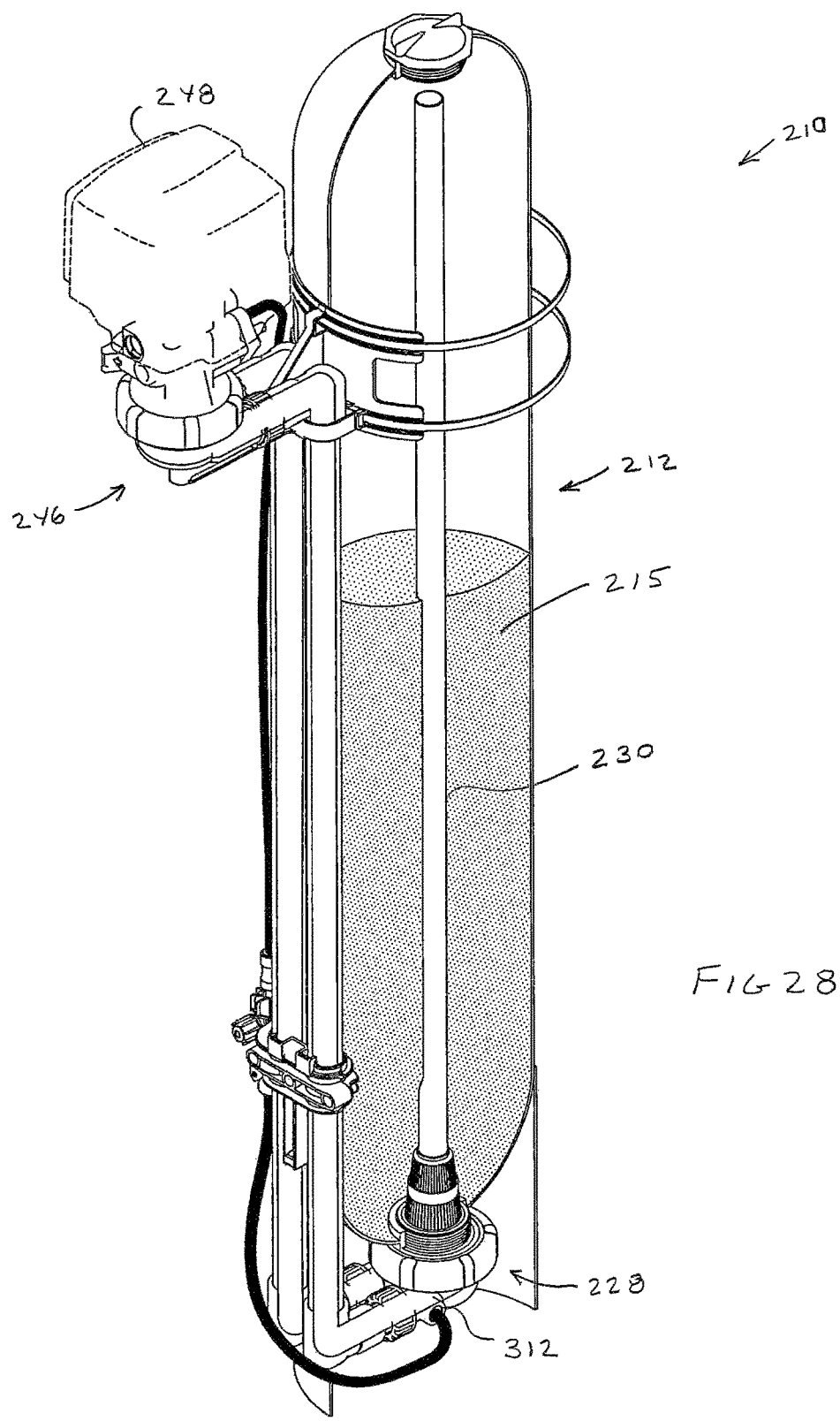

Tank 212 includes a tank wall 214. The tank wall 214 bounds a tank interior area 216. The tank interior area may house filter media, sorbing balls or other material similar to the embodiments previously discussed. Such items are not shown in FIG. 22 for purposes of simplifying the view. Filter media 215 is shown in FIG. 28. The exemplary tank 212 is upright cylindrical tank, however it should be understood that in other embodiments other tank configurations may be used.

Figures 25, 26:
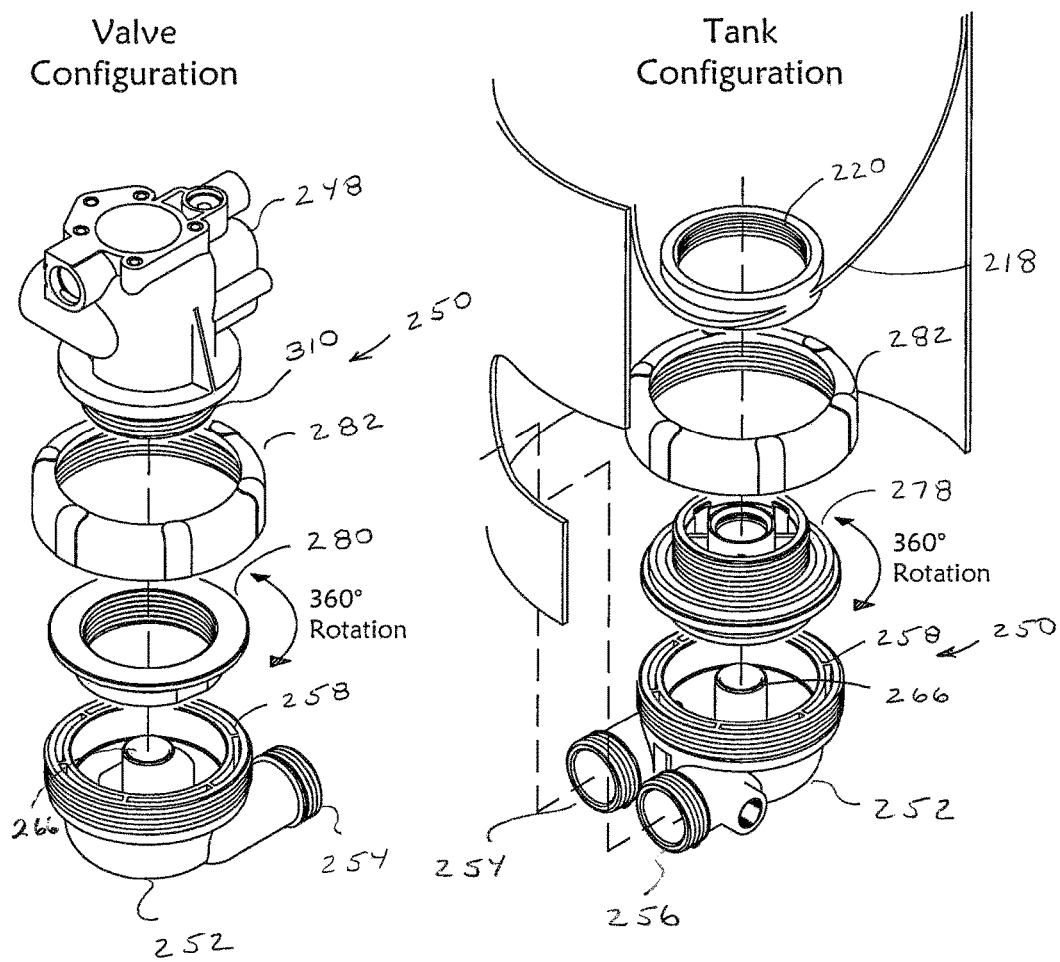
Figure 27:
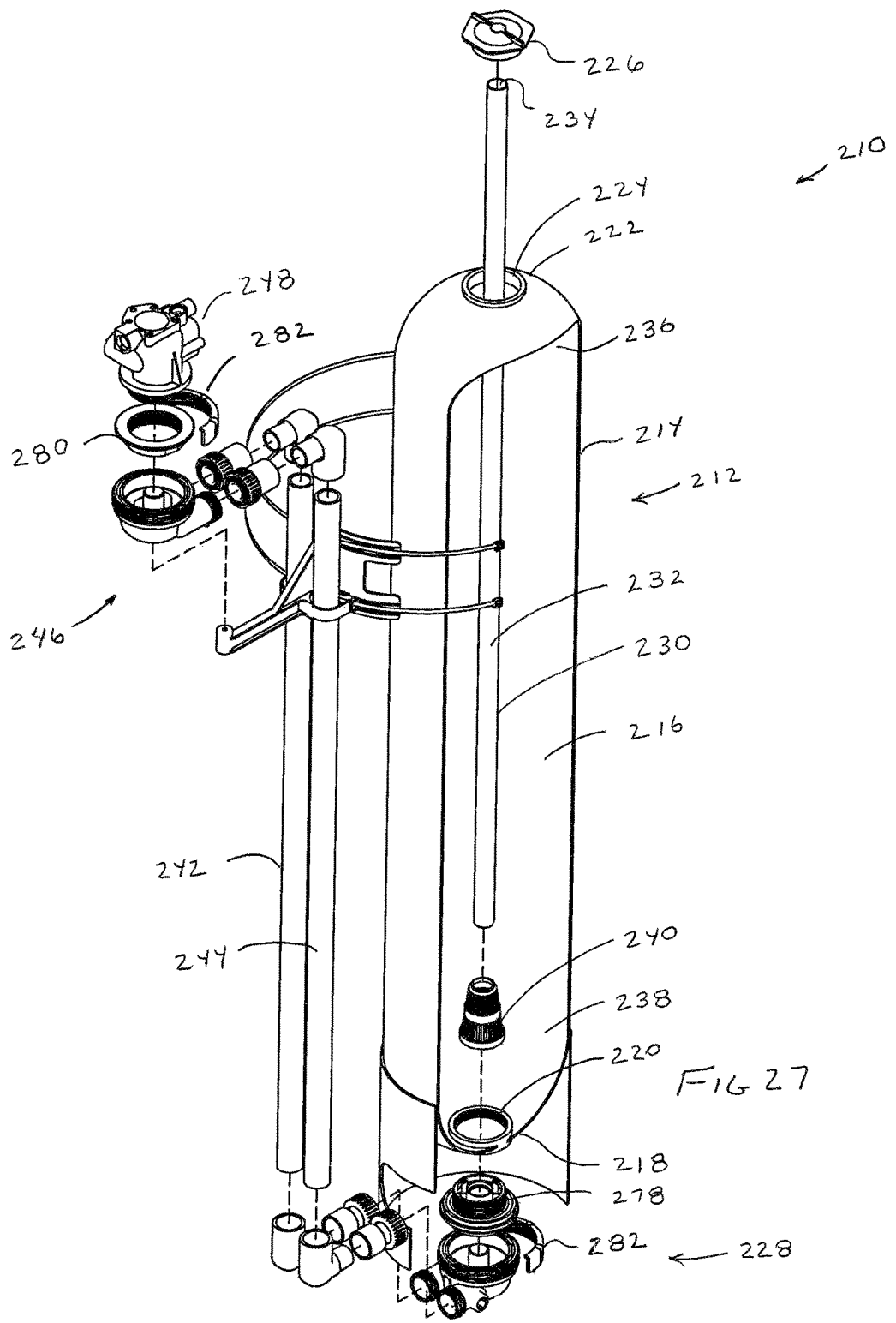

As best shown in FIGS. 26 and 27 tank 212 includes a bottom wall 218. Bottom wall 218 has a threaded opening 220 therethrough. Tank 212 also has a top wall 222. Top wall 222 includes a threaded opening 224. In this arrangement the threaded opening 224 is closed with a plug 226. In an exemplary arrangement the threaded opening 224 may be similar to that shown at the top of tank 14 previously discussed, that is suitable for accepting a threaded valve body projection of a control valve similar to control valves 10 and 110 previously discussed. However, system 210 is configured in a manner similar to system 700 to maintain the interior components of a control valve in a wetted condition.

In the exemplary arrangement the opening 220 in the bottom wall is in engagement with a liquid connector 228. The liquid connector 228 is threadably engaged in the opening 220. A tube 230 extends vertically in the tank interior area 216. The exemplary tube 230 is an elongated solid tube which bounds a tube interior area 232. Tube 230 has an opening 234. Opening 234 is positioned in an upper area 236 of the tank. In operation of the system 210 upper area 236 may house an air pocket similar to system 710.

The interior area 216 of the tank 212 also includes a lower area 238. The lower area is generally below the filter media 215 or other water treatment material housed within the tank interior area. A strainer 240 extends in surrounding relation of the tube 230 and is connected to a fluid passage in the liquid connector 228 as hereinafter discussed. The strainer 240 may be similar in operation to the strainers deviously discussed such as strainer 30. It should also be understood that the tank interior area may include other structures such as a distribution plate or other items for providing support to filter media or other liquid treatment components.

The exemplary liquid connector 228 is connected to a first pipe 242 and a second pipe 244. Pipes 242 and 244 are connected to ports of the liquid connector 228 through couplings as shown. First pipe 242 is in fluid connection with the lower area of the tank 238 through the strainer 240. Second pipe 244 is in fluid connection with the interior area 232 of the tube 230. Pipes 242 and 244 are connected to a liquid connector 246. Liquid connector 246 includes ports which are connected to pipes 242 and 244 through couplings. Liquid connector 246 is connected to a control valve 248. In exemplary arrangements control valve 248 may be similar to valves 10, 110 and 710 previously discussed. In the exemplary arrangement liquid connector 246 is an interchangeable connector similar to liquid connector 228 that is suitable for providing two separated fluid flow paths therethrough for connection to separate areas of a liquid treatment tank or ports of a control valve.

An exemplary liquid connector 250 is shown in FIGS. 23 through 26. Liquid connector 250 includes a body 252. Body 252 includes a first port 254 and a second port 256. In the exemplary arrangement ports 254 and 256 extend outward from the body in parallel side-by-side relation. Each of the ports include suitable structures to be releasably connect to pipes in a manner like that previously discussed.

Body 252 includes an annular wall 258. Annular wall 258 bounds annular liquid opening 260. Annular wall 258 includes a generally smooth inside annular wall surface 262. Annular wall 258 also includes an annular threaded outside wall surface 264.

Figure 24:
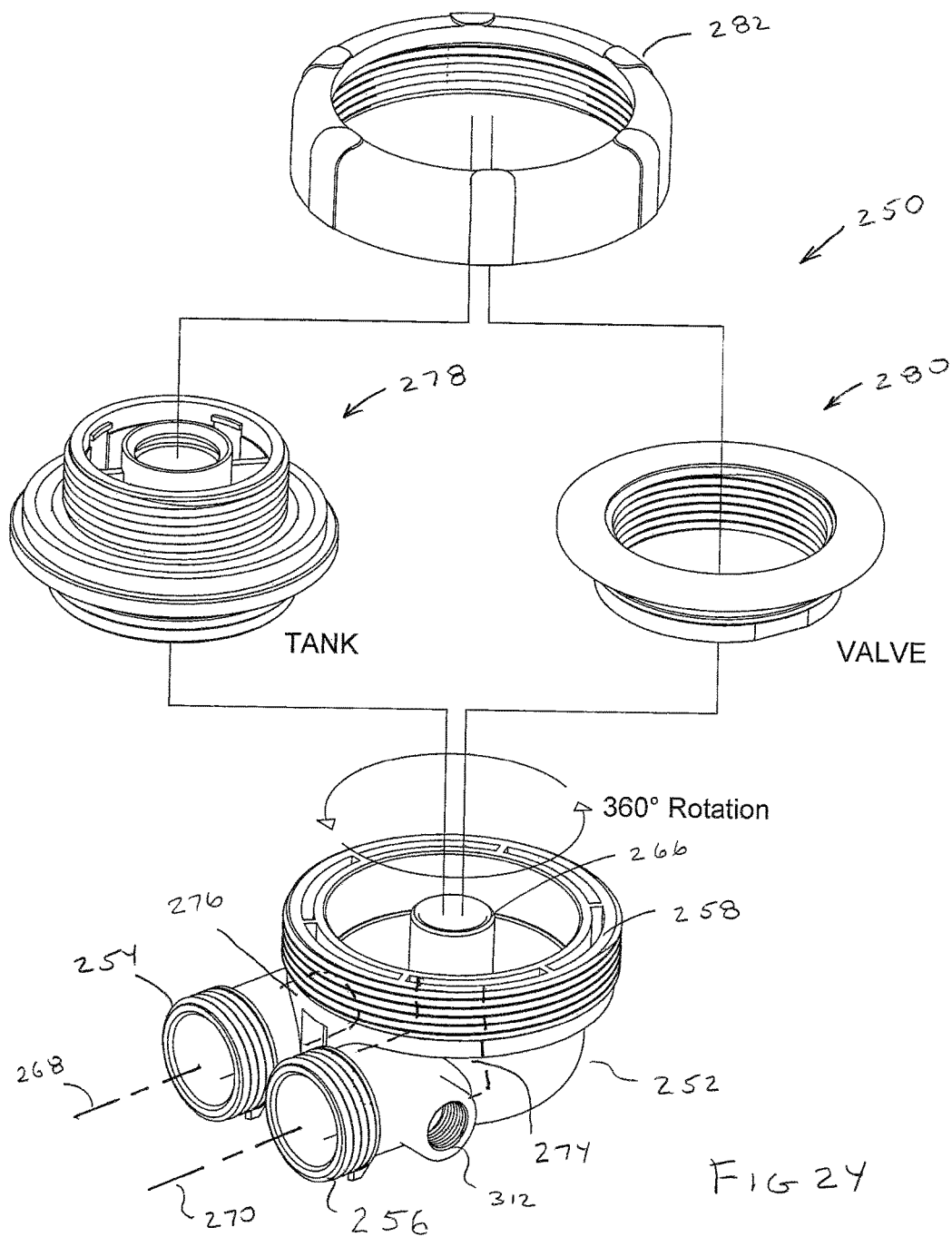

A pipe 266 extends in centered concentric relation within the annular wall 258. The pipe includes a pipe opening 268. The pipe 266 extends perpendicular to the centerlines 270, 272 of first port 254 and second port 256. As shown in FIG. 24, second port 256 is fluidly connected to pipe opening 268 through a passage 274 in body 252. First port 254 is fluidly connected to the annular liquid opening 260 through a fluid passage 276. Fluid passages 274 and 276 are fluidly separated within the body.

Figure 23:
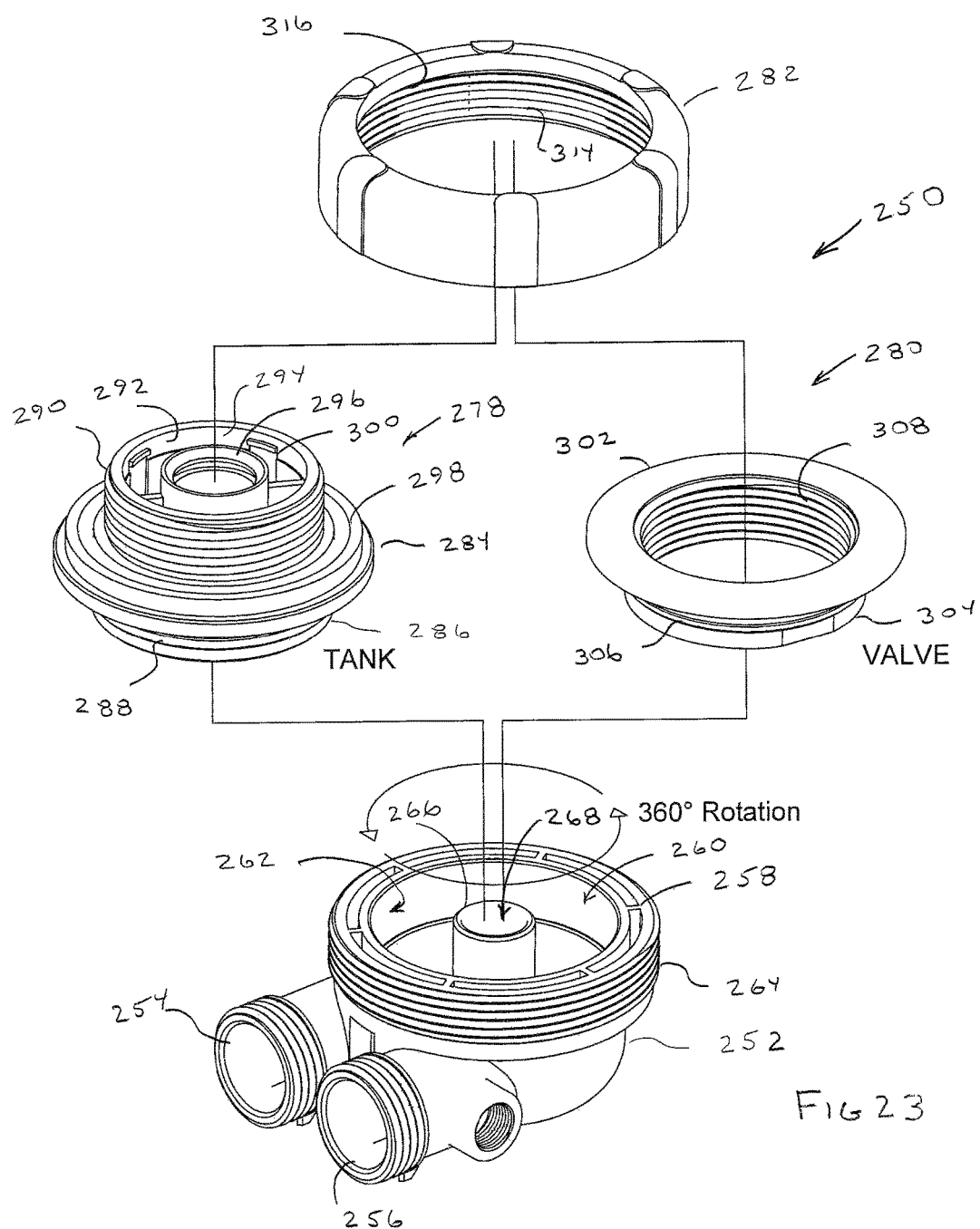

In the exemplary arrangement, liquid connector 250 may be interchangeably connected to a liquid treatment tank or a control valve by connection to a respective adapter. As shown in FIGS. 23, 24 and 26, a tank adapter 278 is used to connect the connector with a tank. As shown in FIGS. 23 through 25, a valve adapter 280 is used to connect the connector with a control valve 248. In the exemplary arrangement a securing ring 282 is used to hold the adapter in engagement with the body.

Tank adapter 278 includes a central annular outward tank adapter flange 284. An annular tank adapter projection 286 extends axially from the flange in a first axial direction. The tank adapter projection 286 is sized to be accepted in close fitting relation with the inside annular wall surface 262 of body 252. Tank adapter projection 286 includes an annular recess in which an annular resilient seal 288 is positioned. The tank adapter projection seal is operative to engage annular wall surface 262 in fluid tight sealing engagement. Of course it should be understood that this type of seal arrangement is exemplary and in other embodiments other types of sealing arrangements may be used.

Tank adapter 278 further includes a threaded annular nipple projection 290. Threaded annular nipple projection 290 is configured to engage threaded opening 220 in the bottom wall 218 of tank 212. Nipple projection 290 bounds a nipple interior annular wall 292. Nipple interior annular wall bounds a chamber 294.

Tank adapter 278 further includes a central coupling 296. The central coupling 296 is concentric with the nipple interior annular wall 292. Central coupling 296 extends through the tank adapter and engages pipe 266 of the body 252. The chamber 294 is fluidly connected to the annular liquid opening 260 of the body 252. As a result the interior area of the central coupling is maintained fluidly separate from the chamber within the tank adapter 278.

Tank adapter 278 further includes a resilient tank seal 298. Tank seal 298 is configured to extend in surrounding relation of the threaded annular nipple projection 290. Tank seal 298 is supported on the tank adapter flange 284, but is disposed radially inward from the outermost portion thereof so that the tank seal is inwardly disposed from the securing ring 282 when the liquid connector is assembled. Tank seal 298 is configured to resiliently sealingly engage the bottom wall 218 of the tank and the tank adapter flange 284 so as to provide a fluid tight seal.

The exemplary tank adapter further includes a plurality of angularly disposed clips 300. Clips 300 are configured to releasably engage strainer 240. This enables the strainer to be fluidly connected with the chamber 294. The central coupling 296 is configured to be connected to the tube 230. This enables the tube interior area 232 to be fluidly connected with the interior of the central coupling, pipe 266 and second port 256 of the body 250.

When in use the tank adapter 278 extends through the bottom wall 218 of the tank 212. The tank adapter is threadably engaged with the tank wall in sealed relation. The tank adapter enables fluid connection of the first port 254 of the body with the lower area 238 of the tank, and the second port 256 of the body to be connected with the upper area 236 through the tube 230. The liquid connector 250 enables these separate areas of the tank to be fluidly connected to the connector and to provide separate connections thereto.

The exemplary valve adapter 280 includes an annular valve adapter flange 302. An annular valve adapter projection 304 extends axially from flange 302. The annular valve adapter projection is sized to be accepted in the annular liquid opening 260 in close fitting relation with the inside annular wall surface 262 of the body 252. The exemplary valve adapter projection 304 includes an annular recess in which an annular resilient valve adapter projection seal 306 is positioned. When the valve adapter 280 is engaged with the body 252, seal 306 sealingly extends between annular surface 262 of the body and annular surface 304 of the valve adapter so as to provide a fluid tight connection. Of course this seal arrangement is exemplary and other types of sealing arrangements may be used.

Valve adapter 280 includes a threaded valve adapter opening 308. Valve adapter opening 308 is configured to receive therein a threaded valve body projection 310 and underside of a control valve such as those previously discussed. For example in some arrangements the threaded valve body projection may be an annular threaded projection 310 such as is shown on the body of valve 10 in FIG. 1 and valve 248 in FIG. 26. Such a threaded valve body projection may be suitable for engaging a threaded opening at the top of a tank such as is shown in FIG. 1 as well as for engaging valve adapter 280.

In the exemplary arrangement the valve adapter 280 is configured such that two valve ports are separately fluidly engaged with the liquid connector 250. Using valve 10 which was previously discussed as an example, when the valve is engaged with the valve adapter 208 the second tank port 60 (E) is fluidly engaged with the pipe 266. Likewise, the first tank port 58 (D) is fluidly engaged with the annular liquid opening 60 of the body 250. As a result the first and second ports of the valve are separately fluidly engaged respectively with ports 254, 256 of the body 252. Specifically in the exemplary arrangement using control valve 10, port E of the valve is engaged with second port 256 of the body while port D of the valve is fluidly engaged with first port 254 of the body. Of course it should be understood that this approach is exemplary and in other embodiments other approaches may be used.

The exemplary body 252 further includes an injector port 312. Injector port 312 is a closable port that is configured to be closed with a plug or similar stopper when not in use. Injector port 312 is in fluid connection with passage 274 which is connected to second port 256 and pipe 266. Injector port 312 is usable to provide air injection into the interior area of the tank 212 through the tube 230. As shown in FIG. 28 this may be done using a hose or similar connector that supplies air from an air injector which may be similar to air injector assembly 712 of the previously discussed embodiment. Of course injector port 312 may be used for other purposes as well. Also, while only one injector port is shown in connection with passage 274, other embodiments may include additional ports including a port in connection with passage 276.

In the exemplary embodiment, the liquid connector securing ring 282 is used when either of the tank adapter 278 or the valve adapter 280 is engaged with the body 252. Securing ring 282 includes a threaded barrel 314. The threaded barrel 314 is configured to engage the threaded outside wall surface 264 of body 252. Securing ring 282 further includes a radiantly inwardly extending annular lip 316. The axially inner annular surface of lip 316 is configured to outwardly overlie the outer portion of flange 302 of the valve adapter and flange 284 of the tank adapter. As previously discussed, the exemplary tank seal 298 is configured to extend radially inward of the lip 316 so that the tank seal can engage the outer surface of the tank in fluid tight sealing relation. Of course it should be understood that this arrangement is exemplary and in other embodiments other approaches may be used.

The exemplary liquid connector 250 is useful in that it enables the direction of the ports 254, 256 to be set as desired anywhere within a 360° angle of rotation. This is because each of the valve adapter 280 and tank adapter 278 may be positioned in any angular orientation relative to the body 252. As a result, the position for the ports of the liquid connector may be selected so as to facilitate the plumbing of the liquid treatment system and position the control valve and/or other elements as is best suitable for the particular system arrangement.

Of course it should be understood that the liquid connector arrangement shown is exemplary and one that may be used in connection with a liquid treatment arrangement using control valves and liquid treatment tanks of the type previously discussed. The exemplary arrangement is particularly useful in connection with a system for water treatment where it is assured that the interior components of the valve remain wetted generally continuously so as to avoid the buildup of material within the valve that could hinder its operation and limit its useful life. Of course, exemplary liquid connectors may also have other arrangements of ports, connectors and other structures to facilitate the operation in other types of systems while utilizing the principles described herein.

Thus the exemplary embodiments achieve improved operation, eliminate difficulties encountered in the use of prior valve devices and systems and attain the useful results described herein.

In the foregoing description, certain terms have been used for brevity, clarity and understanding. However, no unnecessary limitations are to be implied therefrom because such terms are used for descriptive purposes and are intended to be broadly construed. Moreover the descriptions and illustrations herein are by way of examples and the new and useful concepts are not limited to the features shown and described.

It should be understood that the features and/or relationships associated with one embodiment can be combined with features and/or relationships from another embodiment. That is, various features and/or relationships from various embodiments can be combined in further embodiments. The inventive scope of the disclosure is not limited to only the embodiments shown or described herein.

Having described the features, discoveries and principles of the exemplary embodiments, the manner in which they are constructed and operated, and the advantages and useful results attained, the new and useful features, devices, elements, arrangements, parts, combinations, systems, equipment, operations, methods, processes and relationships are set forth in the appended claims.

We claim:
1. Apparatus comprising:
a valve adapter,
a tank adapter,
a liquid connector,
the liquid connector including two separated flow paths therethrough, including
a body, wherein the body includes
a pair of external flow ports, wherein each external flow port is configured to be connected to a respective liquid conduit outside the body,
an annular opening,
a pipe, wherein the pipe has a pipe opening and is concentric within the annular opening,
wherein the annular opening is fluidly connected to a first port of the pair through a first passage within the body,
wherein the pipe opening is fluidly connected to a second port of the pair through a second passage within the body,
wherein the first passage is fluidly separate from the second passage within the body,
an annular wall bounding the annular opening, wherein the annular wall is configured to interchangeably engage in fluid tight engagement with one of the valve adapter and the tank adapter,
wherein the tank adapter is configured to extend through a tank wall to an interior area of a tank, wherein when the tank adapter is the one in fluid tight engagement with the annular wall the tank adapter separately fluidly engages the pipe opening and the annular opening with different areas within the interior area of the tank,
wherein the valve adapter is configured to engage a valve body of a valve, wherein the valve body includes a first valve port and a second valve port thereon, wherein when the valve adapter is the one in fluid tight engagement with the annular wall the valve adapter separately fluidly engages the second valve port and the pipe opening, and the first valve port and the annular opening.

2. The apparatus according to claim 1 and further including at least one resilient seal, wherein the at least one resilient seal extends in sealing engagement between the annular wall and the respective one of the tank adapter and the valve adapter.

3. The apparatus according to claim 1 wherein the annular wall includes an inside annular wall surface, wherein the tank adapter includes an annular tank adapter projection that when the tank adapter is the one in fluid tight engagement with the annular wall, extends in the annular opening in close fitting relation with the inside annular wall surface, wherein the valve adapter includes an annular valve adapter projection that when the valve adapter is the one in fluid tight engagement with the annular wall, extends in the annular opening in close fitting relation with the inside annular wall surface.

4. The apparatus according to claim 3 and further including a resilient annular tank adapter projection seal, wherein when the tank adapter is the one in fluid tight engagement with the annular wall, the annular tank adapter projection seal sealingly extends between the annular tank adapter projection and the inside annular wall surface, a resilient annular valve adapter projection seal, wherein when the valve adapter is the one in fluid tight engagement with the annular wall, the annular valve adapter projection seal sealingly extends between the annular valve adapter projection and the inside annular wall surface.

5. The apparatus according to claim 1 wherein the annular wall includes an annular threaded outside wall surface, wherein the tank adapter includes an annular tank adapter flange, wherein the valve adapter includes an annular valve adapter flange, and further including a releasable securing ring, wherein the securing ring includes a threaded barrel configured to engage the annular threaded outside wall surface, a radially inward extending annular lip, wherein the annular lip is configured to engage the valve adapter flange in outwardly overlying engagement when the valve adapter is the one in fluid tight engagement with the annular wall, and the tank adapter flange in outwardly overlying engagement when the tank adapter is the one in fluid tight engagement with the annular wall.

6. The apparatus according to claim 3 wherein the annular wall includes an annular threaded outside wall surface, wherein the tank adapter includes an annular tank adapter flange, wherein the valve adapter includes an annular valve adapter flange, and further including a releasable securing ring, wherein the securing ring includes a threaded barrel configured to engage the threaded outside wall surface of the annular ring, a radially inward extending annular lip, wherein the annular lip is configured to engage in overlying engagement the valve adapter flange when the valve adapter is the one in fluid tight engagement with the annular wall, and the tank adapter flange in outwardly overlying engagement when the tank adapter is the one in fluid tight engagement with the annular wall.

7. The apparatus according to claim 5 wherein the tank adapter includes a threaded annular nipple projection, wherein the nipple projection extends axially outward relative to the annular tank adapter flange, wherein the nipple projection is configured to engage a threaded tank opening in the tank wall when the tank adapter is the one in fluid tight engagement with the annular wall.

8. The apparatus according to claim 5 wherein the valve adapter includes a threaded valve adapter opening concentric with the valve adapter flange, wherein the threaded valve adapter opening is configured to engage a threaded valve body projection, wherein the first and second valve ports are positioned radially inward of the threaded valve body projection when the valve adapter is the one in fluid tight engagement with the annular wall.

9. The apparatus according to claim 5 wherein the first port and the second port extend outward in parallel side-by-side relation from the body.

10. The apparatus according to claim 5 wherein the body further includes a closable injector port, wherein the injector port is in fluid connection with the second passage within the body.

11. The apparatus according to claim 9 wherein the body further includes a closable injector port, wherein the injector port is in fluid connection with the second passage within the body.

12. The apparatus according to claim 9 wherein each of the pair of first and second ports extend perpendicular to the pipe, wherein when the tank adapter is the one in fluid tight engagement with the annular wall, the tank adapter is selectively rotationally positionable relative to the body at any angular position throughout a range of 360°, and wherein when the valve adapter is the one in fluid tight engagement with the annular wall, the valve adapter is selectively rotationally positionable relative to the body at any angular position throughout the range of 360°.

13. The apparatus according to claim 7 wherein the tank adapter further includes an annular resilient tank seal, wherein the tank seal extends in surrounding relation of the threaded annular nipple projection and radially inward of the inwardly extending annular lip of the securing ring, wherein when the tank adapter is the one in fluid tight engagement with the annular wall, the tank seal is configured to sealingly engage in fluid tight relation an outer surface of the tank wall adjacent the tank opening and the tank adapter flange.

14. The apparatus according to claim 1
wherein the tank adapter is configured to extend through a bottom wall of an upright cylindrical liquid treatment tank,
wherein the tank adapter includes an axially central coupling and a chamber disposed radially outward of the central coupling,
wherein the central coupling is configured to engage an elongated solid upright tube bounding a tube interior area that extends in the tank, and wherein the central coupling is operative to place the tube interior area in fluid connection with the pipe opening,
wherein when the tank adapter is the one in fluid tight engagement with the annular wall, the chamber is fluidly connected with the annular opening,
and the tube interior area is fluidly separated from the chamber and the annular opening within the body and the tank adapter.

15. The apparatus according to claim 5
wherein the tank adapter includes a threaded annular nipple projection configured to extend in a bottom wall of a cylindrical upright liquid treatment tank,
wherein the tank adapter includes an axially central coupling and a chamber disposed radially outward of the central coupling, wherein a nipple interior annular wall of the nipple projection bounds the chamber,
wherein the central coupling is configured to engage an elongated solid upright tube bounding a tube interior area that extends in the tank, and wherein the central coupling is operative to place the tube interior area in fluid connection with the pipe opening,
wherein when the tank adapter is the one in fluid tight engagement with the annular wall, the chamber is fluidly connected with the annular opening,
and the tube interior area is fluidly separated from the chamber and the annular opening within the body and the tank adapter.

16. The apparatus according to claim 15
wherein the nipple interior annular wall includes at least one clip, wherein the at least one clip is configured to operatively engage a strainer, wherein the strainer overlies the chamber and extends in surrounding relation of the tube.

17. The apparatus according to claim 14, wherein the tank adapter is the one in fluid tight engagement with the annular wall,
and further including
a further liquid connector, including a further body, wherein the further body is identical to the body, and includes a further annual wall, a further first port and a further second port,
wherein the further annular wall is engaged in fluid tight engagement with the valve adapter, and
wherein the first port of the body is fluidly connected with the further first port of the further body, and wherein the second port of the body is fluidly connected with the further second port of the further body.

18. The apparatus according to claim 17 and further including
the cylindrical liquid treatment tank and the valve,
wherein the tank adapter is engaged with the bottom wall of the tank,
wherein the valve is engaged with the valve adapter,
wherein the tank includes liquid treatment material in generally horizontal surrounding relation of the upright tube, wherein the tube includes a tube opening above the liquid treatment material.

19. The apparatus according to claim 18, wherein the valve includes
a control valve configured for use in connection with the liquid treatment tank,
the control valve including:
the valve body, wherein the valve body houses a valve interior area, the valve interior area including
a longitudinally elongated cylindrical bore and
a piston, wherein the piston is selectively longitudinally movable within the bore,
a plurality of annular flow cavities, wherein at least one of the piston or the valve body includes the plurality of annular flow cavities,
wherein the valve body further includes
a plurality of fluid ports, wherein the fluid ports are in fluid connection with the bore,
wherein the fluid ports include
an untreated liquid port, wherein the untreated liquid port is configured to be operatively connected to a source of untreated liquid at elevated pressure, wherein the untreated liquid includes oxidizable contaminants,
a treated liquid port, wherein the treated liquid port is configured to be operatively connected to at least one treated liquid use device,
a drain port, wherein the drain port is configured to be operatively connected to a waste liquid drain,
the first valve port, wherein the first valve port is fluidly connected to the tube interior area and to a first interior area of the tank disposed above the liquid treatment material in the tank,
the second valve port, wherein the second valve port is fluidly connected to the chamber of the tank adapter and a second interior area of the tank disposed below the liquid treatment material in the tank,
wherein selected ports are enabled to be in fluid connection through the flow cavities responsive at least in part to different longitudinal positions of the piston in the bore,
wherein the first interior area of the tank includes an upper portion configured to house an air pocket, wherein the tube opening is in the upper portion,
a valve controller, wherein the valve controller is operable to selectively move the piston to a plurality of longitudinal positions,
wherein in a first longitudinal position the untreated liquid port and the first valve port are in fluid connection through the valve, and the second valve port and the treated liquid port are in fluid connection through the valve, whereby the valve is in a filter service condition and untreated liquid is treated by passing through the air pocket and the liquid treatment material, and delivered from the valve through the treated liquid port, and wherein in the filter service condition the valve interior area remains in a wetted condition.

20. Apparatus comprising
a valve adapter,
a tank adapter,
a liquid connector,
the liquid connector including two separate flow paths therethrough, including
a body, wherein the body includes two adjacent external flow ports extending in parallel side-by-side adjacent relation outside the body, wherein each such flow port is adapted for connection to a separate liquid conduit, wherein the body includes an annular wall, wherein the annular wall bounds an annular liquid opening, wherein the body includes a pipe, wherein the pipe is concentric within the annular wall and is perpendicular to each of the external flow ports, wherein the pipe includes a pipe opening, wherein the annular opening is fluidly connected to a first external flow port through a first passage within the body, wherein the pipe opening is fluidly connected to a second external flow port through a second passage within the body, wherein the first passage is fluidly separate from the second passage within the body, wherein the annular wall is configured to interchangeably engage in fluid tight engagement, with one of the valve adapter and the tank adapter, wherein the tank adapter is configured to extend through a tank wall to an interior area of a tank, wherein when the tank adapter is the one in fluid tight engagement with the annular wall, the tank adapter separately fluidly engages the pipe opening and the annular opening with respective different areas within the interior area of the tank, wherein the valve adapter is configured to engage a valve body of a valve, wherein the valve body includes a first valve port and a second valve port thereon, wherein when the valve adapter is the one in fluid tight engagement with the annular wall, the valve adapter separately fluidly engages the second valve port and the pipe opening, and the first valve port and the annular opening, wherein when the valve adapter is the one in fluid tight engagement with the annular wall, the valve adapter is selectively rotationally positionable relative to the body at any angular position throughout a range of 360°, and wherein when the tank adapter is the one in fluid tight engagement with the annular wall, the tank adapter is selectively rotationally positionable relative to the body at any angular position throughout the range of 360°.

21. Apparatus comprising:
a tank adapter,
a liquid connector,
wherein the liquid connector includes
two separated flow paths therethrough,
a body, wherein the body includes
a pair of external flow ports, wherein each external flow port is configured to be connected to a respective liquid conduit outside the body,
an annular opening,
a pipe, wherein the pipe has a pipe opening and is concentric within the annular opening,
wherein the annular opening is fluidly connected to a first port of the pair through a first passage within the body,
wherein the pipe opening is fluidly connected to a second port of the pair through a second passage within the body,
wherein the first passage is fluidly separate from the second passage within the body,
an annular wall bounding the annular opening, wherein the annular wall is configured to releasably engage the tank adapter in fluid tight engagement, wherein the tank adapter is configured to extend through a tank wall to an interior area of a tank, wherein the tank adapter separately fluidly engages the pipe opening and the annular opening with different areas within the interior area of the tank.

22. The apparatus according to claim 21
and further comprising:
a valve adapter,
wherein the annular wall of the body is configured to releasably engage the valve adapter in fluid tight engagement,
wherein in the operative condition the annular wall is in fluid tight engagement with one of the tank adapter and the valve adapter,
wherein the valve adapter is configured to engage a valve body of a valve,
wherein the valve body includes a first valve port and a second valve port thereon,
wherein when the valve adapter is the one in fluid tight engagement with the annular wall, the valve adapter separately fluidly engages
the second valve port and the pipe opening, and
the first valve port and the annular opening.

23. Apparatus comprising:
a liquid connector including two separate flow paths therethrough, including
a body, wherein the body includes two adjacent external flow ports extending in parallel side-by-side adjacent relation outside the body, wherein each such flow port is adapted for connection to a separate liquid conduit,
wherein the body includes an annular wall, wherein the annular wall bounds an annular liquid opening,
wherein the body includes a pipe, wherein the pipe is concentric within the annular wall and is perpendicular to each of the external flow ports, wherein the pipe includes a pipe opening,
wherein the pipe opening is fluidly connected to a first external flow port through a first passage within the body,
wherein the pipe opening is fluidly connected to a second external flow port through a second passage within the body,
wherein the first passage is fluidly separate from the second passage within the body,
a tank adapter,
wherein the annular wall is releasably engaged in fluid tight engagement with the tank adapter,
a tank,
wherein the tank includes a tank wall, wherein the tank wall bounds a tank interior, wherein the tank wall includes a tank wall opening,
wherein the tank adapter extends through the tank wall to the tank interior area,
wherein the tank adapter separately fluidly engages the pipe opening and the annular opening respectively with a first interior area of the tank interior and a second interior area of the tank interior,
a valve,
wherein the valve includes a valve body, wherein the valve body includes a first valve port and a second valve port,
a further liquid connector, including a further body, wherein the further body is identical to the body, wherein the further body includes
a further annular wall,
a further port opening, and
a further annular opening,
a valve adapter,
wherein the further annular wall is releasably engaged in fluid tight engagement with the valve adapter,
wherein the valve adapter is releasably engaged with the valve,
wherein the valve adapter separately fluidly engages the second valve port and the further port opening and the first valve port and the further annular opening,
wherein the first value port is in fluid connection with the first interior area and the second valve port is in fluid connection with the second interior area.

24. The apparatus according to claim 23
wherein the annular wall includes an inside annular wall surface, and the further annular wall includes a further inside annular wall surface,
wherein the tank adapter includes an annular tank adapter projection that extends in the annular opening in close fitting relation with the inside annular wall surface,
wherein the valve adapter includes an annular valve adapter projection that extends in the further annular opening in close fitting relation with the further inside annular wall surface.

25. The apparatus according to claim 23
wherein the annular wall includes an annular threaded outside wall surface,
wherein the tank adapter includes an annular tank adapter flange,
and further including a releasable securing ring, wherein the securing ring includes
a threaded barrel configured to engage the annular threaded outside wall surface,
a radially inward extending annular lip, wherein the annular lip is configured to engage the tank adapter flange in outwardly overlying engagement.

26. The apparatus according to claim 23
wherein the further annular wall includes a further annular threaded outside wall surface,
wherein the valve adapter includes an annular valve adapter flange,
and further including a releasable securing ring, wherein the securing ring includes
a threaded barrel configured to engage the further threaded outside wall surface,
a radially inward extending annular lip, wherein the annular lip is configured to engage the valve adapter flange in outwardly overlying engagement.

27. The apparatus according to claim 23
wherein the body further includes a closable injector port, wherein the injector port is in fluid connection with the second passage within the body.

28. The apparatus according to claim 23
wherein the tank adapter is selectively angularly positionable in a range of 360° relative to the body,
and the valve adapter is selectively angularly positionable in the range of 360° relative to the further body.

* * * * *